United States Patent [19]

Nixon

[11] Patent Number: 4,531,973
[45] Date of Patent: Jul. 30, 1985

[54] METALLURGICAL PROCESSES

[76] Inventor: Ivor G. Nixon, 1er Stock Ost, "Matterhorngruss", Steinmattstrasse, 3920 Zermatt, Valais, Switzerland

[21] Appl. No.: 510,926

[22] Filed: Jul. 5, 1983

Related U.S. Application Data

[63] Continuation of Ser. No. 249,495, Mar. 31, 1981, abandoned.

[30] Foreign Application Priority Data

Apr. 8, 1980 [GB] United Kingdom ............... 8011546

[51] Int. Cl.³ .............................................. C21C 7/00
[52] U.S. Cl. .......................................... 75/59.1; 75/43
[58] Field of Search ............................... 75/60, 59, 43

[56] References Cited

U.S. PATENT DOCUMENTS 3,653,877 4/1977 Enya ........................................ 75/43

Primary Examiner—Peter D. Rosenberg
Attorney, Agent, or Firm—McAulay, Fields, Fisher, Goldstein & Nissen

[57] ABSTRACT

The invention relates to various energy saving measures for use in the smelting, refining and melting of metals, and in particular in the manufacture of steels, alloy steels and ferrous alloys. In such processes fuel consumption is reduced and efficiency improved by using in the oxy-fuel or air-fuel burner a fuel (referred to as an "X-type" fuel) which has an exothermic heat of decomposition or which has only a zero or a very small endothermic heat of decomposition.

The invention also relates to an oxy-fuel or air-fuel burner for use in a metallurgical process using an X-type fuel, which burner uses as coolant for the burner walls and tip the fuel used in the burner.

19 Claims, 14 Drawing Figures

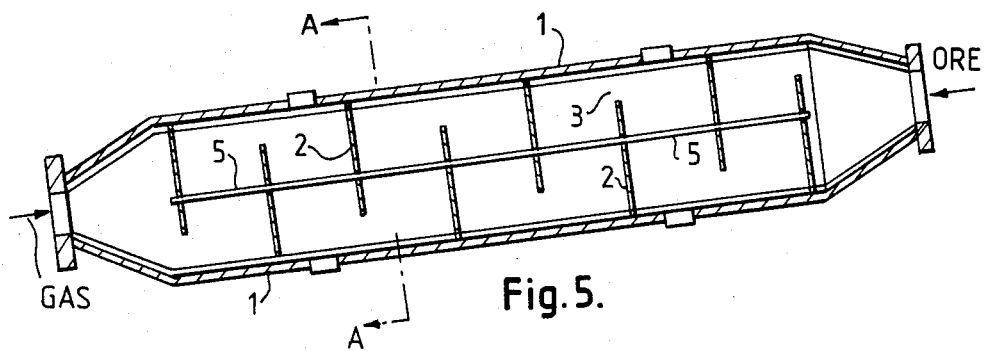
Fig. 5.
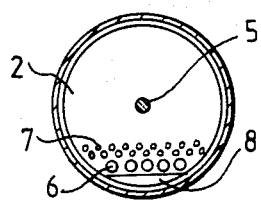
Fig. 5B.
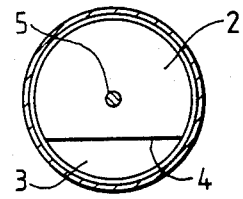
Fig. 5A.
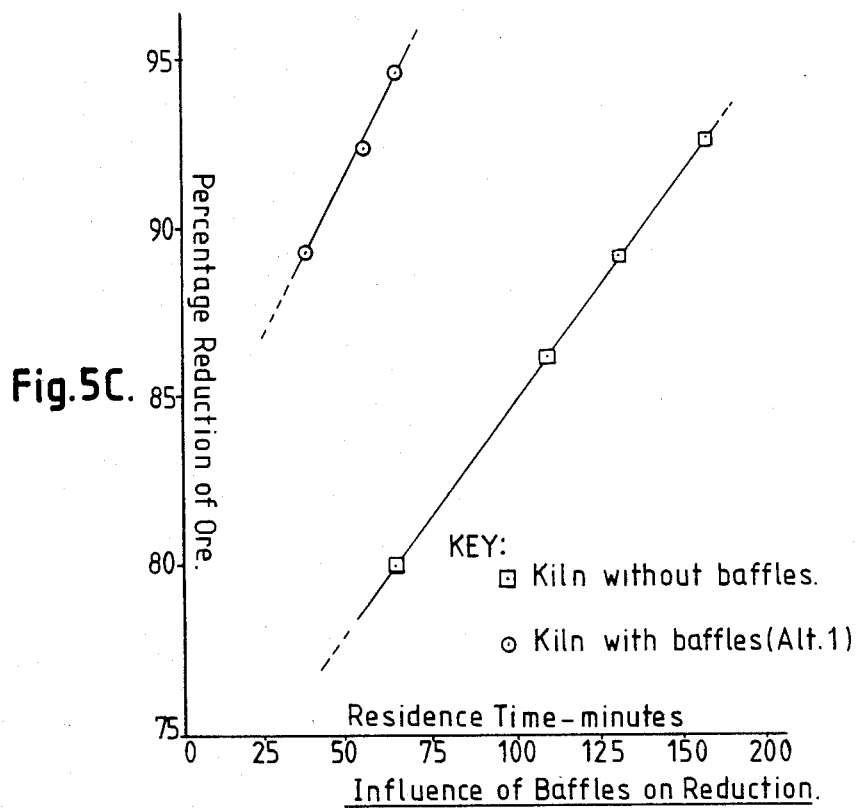
Fig. 5C. Influence of Baffles on Reduction.
KEY:
□ Kiln without baffles.
○ Kiln with baffles (Alt. 1)

METALLURGICAL PROCESSES

This is a continuation of application Ser. No. 249,495 filed Mar. 31, 1981 now abandoned.

This invention relates to the smelting, refinery and melting of metals, and in particular to the manufacture of steels, alloy steels and ferrous alloys.

In the normal process of operating a direct fired steel converter as described for example in my British Patent specification No. 1,369,595, a gaseous mixture of controlled composition, preferably one containing a substantial proportion of hydrogen or hydrogen containing gases, is used to remove, or substantially remove, carbon and other impurities from molten raw metal. The recovery and regeneration of the off-gas from the converter or melting vessel for use as a reducing gas for the reduction of iron ore is preferred to give efficient energy utilisation. This process was viable and attractive as the reducing gases formed could be utilised efficiently for ore reduction. However, the current energy situation emphasizes the need to reduce further the energy consumption for steel manufacture and metal smelting in converters, electric furnaces and melting vessels. At the same time the rise in the cost of building new plant has accentuated the advantage of adapting existing plant for the application of energy saving processes such as that described in my said British patent.

The present invention thus relates to methods for carrying out a metallurgical process. In one such method an oxy-fuel or air-fuel burner is employed, for example in a steel converter or electric furnace, in which the fuel consumption is reduced and efficiency improved by using a fuel for the purpose which has an exothermic heat of decomposition (herein referred to as an 'X-type' fuel) or only a zero or very small endothermic heat of decomposition. Preferably the X-type fuel comprises a hydrocarbon, or mixture of hydrocarbons, having one or more double bonds per molecule and preferably having a ring or fused ring structure for example, light or heavy cycle oils from catalytic cracking, by-products from the severe thermal cracking of petroleum feedstocks such as recycle distillate or reformer residue, and aromatic concentrates from extraction processes. The X-type fuels are preferably either desulphurized or made from low sulphur feedstocks. The X-type fuel may be a pulverised solid fuel such as carbon, coke or coal, fluidised in a stream of another fuel preferably an X-type fuel such as hydrogen or a hydrocarbon stream which has been preheated and vaporized in the customary manner. The hydrogen and carbon have a zero endothermic heat of decomposition, and the coal or coke only a very small one.

The metallurgical process may be the manufacture of steel, an alloy steel or a ferrous alloy, using known methods, preferably those described for example in my British Pat. Nos. 1,508,591/2, and others, which comprises charging to the converter a metal feedstock, for example, steel or alloy scrap, iron sponge, cast iron (hot metal or scrap), alloying constituents and/or minor amounts of their oxides and flux, either severally or as mixtures thereof, and heating and blowing the melt with the oxidising gases from the said burner in order to oxidise and remove the impurities. The oxygen potential (H-ratio) of the said oxidising gases being preferably controlled as described in my cited British Patents.

Alternatively the metallurgical process may be the smelting of a metallic ore, or the melting of a metal or alloy in a crucible or furnace, or an electric furnace.

The invention also provides an improved design of an oxy-fuel or air-fuel burner for use in a metallurgical process, for example in a method as described above, the said improved design providing means for replacing the conventional burner coolant water (for the burner walls and tip) by the fuel used in the burner. If air is fed to the metallurgical vessel as secondary air for combustion within the said vessel, it can also be used as a safe coolant for the burner walls. The fuel and oxygen fed to the burner may be preheated, and the heat efficiency of the converter is further improved by the heat recovery from the burner off-gases, which heat the fuel. Preferably the fuel burnt in the burner is an X-type fuel, or alternatively a conventional fuel.

The lower end of the said burner may be provided with a concentric refractory Venturi throat surrounding the tip, so that the kinetic energy of the emerging burner gases draw in gases forming the atmosphere within the converter, smelter or melting vessel. The said atmosphere consists substantially of carbon monoxide and hydrogen, so that the mixed gases impinging on the melt surface (consisting of the said atmosphere gases mingled with the burner gases) have a lower oxygen potential (H-ratio) than the burner gases alone so that better control of the smelting and refining processes involved is achieved.

The burner, equipped with the Venturi throat, may be an oxy-fuel or air-fuel burner of known design, or an oxygen lance (in which the converter atmosphere is burnt by the oxygen jet in 'reverse combustion') used in any known type of steel converter or electric furnace, or any known metallurgical process vessel.

The invention also provides an improved method for feeding a particulate solid feedstock, for example, flux, ore, carbon or coke or other solid carbonaceous fuel, and particularly iron sponge, to a converter or other metallurgical vessel, in which means are provided so that the said solid feedstocks are distributed as evenly as possible as a concentric envelope around the periphery of the burner flame, so that the particles are entrained by the kinetic energy of the high velocity gases (moving downwards to impact on the melt surface) surrounding the burner flame. The means can comprise feeding the particles onto a rotating disc, revolving above the burner lower part, so that the particles are flung off in random distribution centrifugally to fall as a curtain surrounding the axis of the burner, or by any known means (e.g. Example 3) for the said distribution. In this manner the said particulate feedstock is preheated in the reducing atmosphere of the said high velocity gases ('atmosphere' gases in the converter) surrounding the supersonic flame and aspirated by it. Dust and the fine particles are smelted and adhere to the superheated surface of the melt instead of being entrained by the off-gases and carried out of the converter, while at the same time the said curtain protects the converter lining from the intense heat release of the burner flame.

The invention also relates to a method for carrying out a metallurgical process in which the hot off-gases from the metallurgical process vessel, for example a steel converter, are led to one or more recuperators (which can be batch operated or semicontinuously or continuously operated) in which the potential heat and reducing capacity of the said hot off-gases is utilised to heat and reduce a solid feedstock, for example scrap, ore, sinter and flux, for charging to the said metallurgical process vessel. The said hot off-gases are preferably quenched and reacted with a hydrocarbon stream, as described for example in my British Pat. No. 1,369,595 to form a reducing gas consisting substantially of carbon monoxide and hydrogen, before entering the recuperators at the desired temperature say, 700°–1050° C., and preferably around 900°–950° C. Preferably two recuperators are used in alternate cyclic service, with one preheating and partly reducing the ore, and the other completing the reduction and feeding the solid feedstock to the steel converter, while means are provided (see Example 4) including auxiliary oxy-fuel burners for meeting the heat load at all times, and controllers for the flow of fuel and oxygen to that end and to maintain the desired operating temperatures. Means are also provided for feeding the said hot gases to the recuperators, with high temperature block valves and manifolding, using gas-tight connections (Example 4), and for offtake of the gases from the said recuperators, as well as for the feed of the solid feedstock to, for example, the steel converter, or an electric furnace.

The metallurgical process may be the manufacture of steel, and any known design and method of operation of the steel converter, for example that used in the BOS process, may be used in conjunction with the said recuperators. The recuperators may be vertical stack reaction vessels or rotary kilns equipped with means for retaining the charge in the vessel and for feeding it as desired to the said converter, or metallurgical vessel. The said means may comprise for example a conventional star feeder from the bottom of a vertical stack, and a movable choke for a rotary kiln which retains the charge for reaction and can be opened to allow feed at a regular rate from the rotating kiln to the said metallurgical vessel. Alternatively, a Heberlein annular kiln can be mounted above the said vessel, preferably using gas-tight joints, to provide a regular feed of solid feedstock to it, with the oxy-fuel burner for the said vessel, for example a steel converter, located axially through the annular kiln which thus acts as a recuperator. A metallic oxide or ore, or a mixture of them, may be reduced or partly reduced to form a metal sponge, for feeding to the converter, using two recuperators which are manifolded together with series flow for the reducing gases, and means are provided to control the H ratio so that it is sufficiently low to reduce the metallic oxide or oxides in question contained in one recuperator, the said oxides such as for example chromium being more difficult to reduce than wustite, and using the off-gases from this converter to reduce an iron oxide ore, sinter or pellets in the second recuperator so that the remaining reducing capacity of the said off-gases is utilised in the second recuperator to produce iron sponge in it. The metallic sponges, comprising reduced chrome (or other metallic ore) ore and iron sponge respectively may then be used as separate or as mixed charges to a steel converter to produce in the first case a high chromium content alloy steel and a separate steel melt, and a lower alloy steel blend in the second alternative operation, and means are provided for feeding the reduced ore to the converter (or converters) in this manner.

The recuperators may be rotary kilns equipped with means for improving the contact and therefore reaction velocity, between the reducing gases and the solid feedstock charge. The said means may comprise an assembly of substantially gas-tight baffles spaced along the axis of the kiln, and fixed on an axial rod, the baffles having a portion of each cut out, for example a peripheral part defined by a chord, or alternatively that said portion drilled with holes, so that the gases flowing through the kiln have to pass through the bed of solid feedstock when the cut out, or drilled, portion is immersed in it as the kiln rotates. The said cutout portions are fixed on the axial rod in a spiral pattern, for example at 180 degrees for successive baffles, so that this contact is enforced by alternate baffles, as they rotate. The angle of the said rotary kiln can be higher than normal, say 4° to 45°, and preferably 10° to 20° giving with a finely divided ore a fluidised, or semifluidised bed between the baffles. Means may be provided so that an existing steel converter, or other metallurgical vessel, can be modified so that a gastight joint is provided so that its hot reducing off-gases can be recovered and fed to the said recuperators, or to any other process in which they can be utilised. The said means may comprise a gastight joint assembly consisting of four parts: (i) a concentric annular trough with a bottom sealing plate, welded or bolted to (with seal) the outer surface of the insulated (internally) off-gas outlet nozzle from the said vessel, (ii) a bell attached to the off-gas conduit, with means for lowering it into the said trough, (iii) a gasket of conventional design, or a suitable plastic sealant packing, designed for high temperature operation forming a gastight joint between the machined surface of the lower rim of the said bell and the gasket bearing surface of the said sealing plate, the assembly being provided with conventional means for tightening the joint to withstand either a moderate positive or negative pressure, and (iv) means for cooling the gasket assembly comprising the injection of a coolant or quench gas, preferably one used as a reactant in the process downstream from the said assembly, into the inner gastight chamber formed by the outer wall of the said insulated off-gas outlet nozzle of the converter, the inner wall of the said bell, and the bottom sealing plate. Preferably the said high temperature plastic sealant packing is a mixture of short fibres capable of withstanding a high temperature, for example asbestos, glass, quartz or ceramic ('Triton') fibres, with graphite or colloidal silica as a lubricant and high temperature grease or asphaltic material as a binder.

The invention also relates to a method of carrying out a metallurgical process wherein means are provided for washing the dust laden hot off-gases from a metallurgical vessel with a high boiling point petroleum fraction, for example asphalt, heavy fueloil or distillate, or a stripped tar, in order to remove entrained dust and thus prevent atmospheric pollution or fouling of equipment or catalyst in any process equipment in which the said hot gases are subsequently used, while still maintaining the temperature of the hot gases used in the said process and thus avoid having to heat them. The said means can consist for example of a simple washery, in which the said asphalt or other fraction is circulated over conventional perforated baffle plates, Raschig ring packing or the like, and the hot gases to be purified passed in counter current flow to the wash liquid so that entrained dust is washed out. Preferably the temperature of the said hot gases should not exceed either the initial boiling point of the said wash liquid, or that temperature which causes excessive contamination of the washed gases with petroleum fractions stripped out of the liquid. The washed gases can be cooled. The hot washed off-gases may be utilised for the manufacture of hydrogen, or a hydrogen gas concentrate, by cooling them by conventional means, or quenching them to the desired process temperatures by the injection of steam or a water spray, normally in the range of 200° to 500° C., and providing means for producing hydrogen. The said means may comprise subjecting the mixture of steam and hot gas to the known shift reaction by contacting it in a catalyst chamber or chambers with a known catalyst to convert the carbon monoxide content of the said mixture to carbon dioxide, by reaction with the water with formation of hydrogen and then stripping out the carbon dioxide formed together with any hydrogen sulphide present in the gases, using a suitable solvent, for example di-isopropanolamine. The hydrogen, or hydrogen concentrate can then be used, for example, as an X-type in an oxy-fuel burner used in any steel converter or electric furnace, as described herein for the manufacture of high quality steels, particularly for the fluidisation of a solid fuel such as coal powder or for the manufacture of alloy steels, in accordance with my British Pat. Nos. 1,508,591 and 1,508,592, having very low carbon and sulphur contents.

The invention also provides a method for carrying out a metallurgical process in which means are provided for delivering the hot combustible off-gases from a metallurgical vessel, for example a steel converter, blast furnace, recuperator or ore reduction plant, to be burnt in a steam boiler or other furnace. The said means comprise a gas conduit equipped with a gastight joint to the vessel, and rotatable gastight joints to permit the connection of the said vessel to the boiler so that gas can be burnt in burners together with a supply of secondary air for the recovery of the full potential heat capacity (see Examples 2 and 4) of the gas. The H ratio ($H_2O:H_2$) or corresponding ratio ($CO_2:CO$) for the carbon species, may be utilised to control automatically by known instrumentation the oxygen potential at the critical control locations in the reaction system, by regulating the fuel to oxygen and/or air ratios, and simultaneously controlling the amount of fuel used in the oxy-fuel burners or auxiliary burners, so as to maintain the desired temperature and oxygen potential at the said locations.

The invention also provides a metallurgical vessel having improved insulation and heat efficiency. The vessel may be any metallurgical vessel, for example a steel converter stack kiln, rotary kiln or roaster, or the like. The vessel comprises two or more vessel shells, the inner wall of the inner shell being lined with the normal insulation lining for the metallurgical process involved, and the space between the inner and outer shells being filled with a high efficiency insulation, for example Saffil or Triton porcelain fibre insulation, with means being provided to prevent the said insulation being crushed and over compacted allowing undesirable movement of the inner shell and its charge. The said means for preventing crushing of the insulation consist in supporting the weight of the inner shell, its insulation lining and charge by means of trunnions or brackets attached to the upper, cooler portion of the inner shell, and/or by installing suitable thrust bearings between the two shells arranged so that the full weight of the inner shell and its load is transmitted through the said thrust bearings to the outer shell which in turn is supported by trunions or foundations to take the load of the vessel. The said thrust bearings may be designed with a small cross section, particularly that part in contact with the inner shell which can be conical or rounded on that end, so that heat losses are minimised through the said bearings, which are constructed of metal with a high tensile and creep strength at elevated temperatures for example of alloy steel or titanium, as is preferably also the said inner shell. The metallurgical vessel may be a conventional steel converter, for example a BOS converter, which preferably comprises a converter assembly in which the inner shell is an existing converter adapted to operate as described above by fitting to its outer surface the said high efficiency insulation with a containing jacket.

The invention also provides a method for carrying out a metallurgical process in which the flux is added in sufficient quantities to give a fluid slag with a "Vee Ratio" (weight ratio calcium oxide to silica) within the range of only 0.5 to 2.8, and preferably within the range of 1.1 to 1.8 (Example 6) or lower when magnesium oxide and/or alumina is present in the slag in appreciable amounts. The said slag with low Vee Ratio yields steels and alloy steels with low carbon, phosphorus and sulphur contents when the melt is refined with the gases produced by an oxy-fuel burner ('partial combustion') with a controlled oxygen potential in accordance with the SS method operating in accordance with my quoted patents, with reduced production of slag and costs for flux.

Iron sponge produced from a low grade iron ore, particularly ore with high silica and alumina contents can be used, the said method making the processing of low grade ores economic because of the greatly reduced slag production and flux consumption, with its favourable effect in reducing costs and equipment size. For the processing of iron sponge, with or without other solid feedstocks such as scrap, hot metal and the like, from very low grade iron ores, it is possible in extreme cases to use a two vessel operation using the said SS type of operation in which the low grade ore is first processed in a converter with an acid lining (with or without flux addition) so that the slag Vee Ratio is below 1.0 in a prerefining operation to remove the bulk of the silica and gangue, and then to transfer the melt to a converter with a normal basic lining, such as magnesia, where the refining is completed preferably as described above to obtain a steel of low carbon, phosphorus and sulphur content. The said two vessel operation can be carried out with either batch operation, or continuous flow operation, preferably with the incorporation of the methods described below in the operation. Sufficient magnesia or roasted or unroasted dolomite may be included in the flux (including any present in other solid feedstocks) to total 1 to 10% weight, and preferably 3 to 6%, of the slag formed in the converter, thus reducing attack of the magnesia based lining when used in the said converter.

The invention also provides a method for the manufacture of very low carbon steels, alloy steels or ferrous alloys (having also low phosphorus, sulphur and nitrogen contents) in steel converters or electric furnaces which comprises subjecting the steel melt to a number of alternate short periods of, respectively, high and low oxygen potential. In the first of said periods the carbon is oxidised (together with other impurities) and removed from the system mainly as carbon monoxide, while simultaneously part of the metal in the melt (for example, easily oxidised chromium) forms its oxide and is absorbed in the slag. In the second of said periods the carbon continues to be purged from the melt by the blowgas as monoxide, while the metallic oxide is reduced to metal again. The said high oxygen potential is achieved by employing an SS blowgas for that period with a high H ratio, and/or charging a portion of a metallic oxide, for example partly reduced iron sponge containing wustite. The said low oxygen potential periods are obtained by lowering the H ratio of the blowgas to, say, 0.01–0.10 and preferably around 0.07, for example for chrome alloy steels; alternatively the said superheated blowgas can comprise a mixture of hydrogen and water vapour (i.e. using hydrogen as the fuel) or an inert gas such as argon, nitrogen or a mixture of these. In contrast, the blowgas in the said period can have an H ratio around 0.4 to 1.0, and preferably about 0.8 for normal steels. Preferably for both periods the blowgas has a low average C:H atomic ratio, preferably nil (i.e. of the H species) particularly for the 'low' periods the resulting low $P_{CO}$ giving a low C% according to the thermodynamical equilibrium relationship. The melt can first be blown by conventional methods to a moderate carbon content, say 0.1 to 0.2%, before applying the more complex method described herein which thus can also be used to finish conventional melts from an electric furnace or BOS converter to very low carbon steels.

The invention also provides a method for the production of low phosphorus and sulphur steels, alloy steels and ferrous alloys by providing means for adding the flux to, and removing the slag from, the converter continuously, or substantially so, by making successive small additions or removals respectively of them, with intervals between them. The said means are preferably according to those operations described in Examples 3 and 4.

The invention also provides a method in which the economic manufacture of low phosphorus and sulphur steels is assisted by using a cheaper high sulphur/phosphorus fuel for the first part of the blow and a low phosphorus and sulphur fuel in the oxy-fuel burner, used in the metallurgical vessel for smelting and refining of the charge, for the last part of the blow. The fuel may be a solid, gaseous or liquid fuel, which can have been purified in the former case by floation to remove gangue or by other known methods, and desulphurized in the latter case if a very high grade steel is desired or alternatively a low sulphur and phosphorus fuel may be used throughout the blow. The said low sulphur and phosphorus fuels can be, for example low sulphur crude oil or petroleum fractions derived from it, desulphurized fractions such as cycle oil from catalytic cracked feedstocks, and low sulphur and phosphorus coal or coke produced from it.

The invention also provides a method for carrying out a metallurgical process in a steel converter, wherein means are provided for tapping the steel converter without having to tilt or open the converter, the said means comprising a pipe or conduit inserted in the converter, through which the slag or molten metal can flow coupled with the application of a differential pressure across the two ends of the said pipe or conduit, the said differential pressure being achieved by applying a small positive pressure above atmospheric within the said converter by restricting the flow of the off gases, and/or by attaching a vacuum ladle by means of a gastight joint to a side-tapehole connected to the upper end of the said pipe or conduit so that the fluid flows into the ladle (FIG. 4B). The lower end of the said pipe or conduit (FIG. 4) is immersed in the fluid to be removed, and for slag a slag chamber can conveniently be provided within the converter. Alternatively a vacuum ladle, equipped with a pipe or 'leg' from its bottom, together with a stopper, can be used, and means provided for raising or lowering the said ladle so that the bottom end of the pipe dips into the fluid to be removed. In the case of a gas-tight converter a sealing pipe may be provided through the upper part of the converter shell, dipping into the fluid to be removed, and means provided for raising and lowering the said vacuum ladle so that its bottom leg enters within the said sealing pipe to the desired level for taping off the fluid. The said pipe or conduit can be made of a high melting metal, for example titanium, clad externally and internally with a protective refractory coating to prevent attack by the melt or gas phase in the converter (FIG. 4A). This method may be applied to any conventional type of steel converter, whether gastight or not.

The invention also provides a method of operating a steel converter, wherein the melt in the steel converter is first blown to a low carbon content in order to obtain a low phosphorus and sulphur content, and then recarburized by (i) adding the calculated amount for the desired carbon content of a low phosphorus and sulphur cast iron, while not increasing the contents of the latter impurities in the melt because of the low amount of cast iron needed and the further reduction of the content of them by the oxygen content in the metal, and/or (ii) by recarburizing the melt by a finishing blow with the required amount of a hydrocarbon gas or vapour which is cracked into its elemental constituents with the carbon being substantially absorbed by the metallic melt. The said hydrocarbon can be diluted with an inert gas, for example nitrogen, argon or with carbon monoxide.

The invention also provides a method for carrying out a metallurgical process wherein a final melt of steel, alloy steel or ferrous alloy melt is degassed by giving it a short afterblow with carbon monoxide, or a mixture of carbon monoxide with an inert gas such as nitrogen or argon, and which can also contain a small percentage of carbon dioxide, preferably not over 5%. The said afterblow is effective is reducing the hydrogen content as the composition of the gases stripped out of the melt approaches that dictated by the applicable shift reaction equilibrium, while the oxygen content is also reduced leading to a reduction in the carbon content of the metallic melt, particularly when its oxygen content at the start of the afterblow is high, the elemental carbon and oxygen being purged out as carbon monoxide. The said afterblow carbon monoxide gas may be generated in a batch type solid fuel burner for partial combustion with oxygen, air or a mixture of them. The said batch type solid fuel burner may comprise a solid fuel reaction chamber whose bottom is furnished with a lance for injecting the reaction gases into the said converter. The said reaction chamber may be filled with coke or charcoal, preferably having a low sulphur content, and equipped with means for blowing the said carbon bed with oxygen, air or a mixture of them, so as to generate a carbon monoxide gas which is injected into the melt by the lance. Before use the reaction chamber may be raised to the optimum reaction temperature to obtain a carbon monoxide gas stream with a low percentage of carbon dioxide. The reaction chamber preferably has a high ratio of length to diameter and its bottom part is preferably provided with known means for electrically heating the carbon bed to favour a high yield of carbon monoxide. A preblast with oxygen or air, which is preferably preheated, may be used, until full reaction temperature is reached when the lance is then lowered into the melt.

The present invention provides means for reducing the fuel consumption of a metallurgical process, such as a smelter or converter for example, utilising an air or oxy-fuel burner, or 'partial combustion' burner, either wholly or partly for smelting and refining their feedstock charges, and at the same time discloses and claims new and improved equipment and their methods of usage which can also be used in any other existing process plant employing such type of unimproved equipment. Means are also described for adapting existing converters and melting units so that they can operate efficiently when utilising the methods and equipment described in this invention.

BRIEF DESCRIPTION OF THE DRAWINGS

In the accompanying drawings:

FIG. 5 illustrates a kiln or recuperator for increased gas/solid contact;

FIG. 5A illustrates a particular baffle for use in the kiln or recuperator of FIG. 5;

FIG. 5B illustrates an alternative form of said baffle; and

FIG. 5C is a graph illustrating the effect of baffles in a kiln or recuperator of the type illustrated in FIG. 5.

Figure 1D:
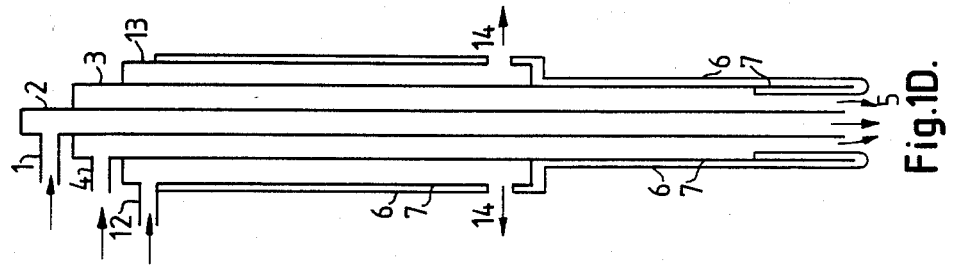
FIG. 1D illustrates a burner design similar to that of FIG. 1A, providing means for the addition of a reactant gas or quench stream in the upper part of the vessel in which the burner is located.

I find that when a selected fuel is used in the said burners, comprising a hydrocarbon, or mixture of hydrocarbons, which has an exothermic, or only mildly endothermic, heat of decomposition then the flame temperature of the burner is higher, and the volume of the combustion gases normally lower, thus reducing the loss of heat in the off-gases from the vessel, than when a normal fuel having a substantial endothermic heat of decomposition is used for the operation in question. The said selected fuels, which are hereinafter referred to as "X-fuels" comprise fuels consisting substantially of hydrocarbons which have one or more double bonds and in particular hydrocarbons which have a ring structure or fused ring structures, or a mixture of hydrocarbons having such structures. Hydrogen and carbon can be included as special cases of X-fuels, because they have a heat of decomposition of zero.

Typical examples of X-fuels are ethylene and other unsaturated hydrocarbons, naphthalene and its homologues, benzene and its homologues and the more complex fused ring hydrocarbons, such as those present in anthracene oil or highly cracked petroleum fractions. Such individual hydrocarbons are normally too expensive to be used as fuels for smelting and refining, but fortunately mixtures of them are available in the petroleum industry, suitable for use as X-fuels, particularly those available as by-products of cracking and extraction processes. For example, light and heavy cycle oil from catalytic cracking; by-products from the thermal cracking of petroleum feedstocks, such a recycle distillate, reformer residue and the aromatic concentrates from extraction processes, such as the Edeleanu and luboil extraction plants. Of these types of X-fuels the by-product cycle oils from catalytic cracking are relatively cheap and available in quantity, and are particularly valuable as X-fuels when derived from the cracking of low sulphur feedstocks, such as those from the low sulphur North Sea crude oils. The effect of the type of fuel on the fuel and oxygen consumption of a steel converter blown by a controlled blowgas, produced from the fuel in an oxy-fuel partial combustion burner with sufficient oxygen to give a blowgas, with as an example 15% mole content of total oxidant (carbon dioxide plus water vapour), is given below in Table 1 below. The heat balance has been calculated in accordance with the method used in my British Pat. No. 1,213,641 for the steel converter, taking the charge to consist of 70 wt.% total iron content sponge reduced to a metallisation of 90%, and 30 wt.% of iron in the form of scrap, with a yield of 20.3 wt.% of slag on the steel made, and with the feedstock preheated to 1200° K. and the oxygen to 550° K., respectively. The very substantial decrease in the fuel and oxygen consumptions for the X-type fuels (Cases 1, 4 and 5) in comparison with the others, makes their use viable under even today's high fuel prices, and competitive with the electric furnace method of making steel which is an inefficient method from the overall energy consumption viewpoint because the electric current used is only about 30% efficient in energy content compared with the fuel from which it is produced.

TABLE I

| | Converter Fuel Consumptions | | | | |
|---|---|---|---|---|---|
| Type of burner fuel: | Case 1 Cycle Oil | Case 2 Methane | Case 3 Naphtha | Case 4 Benzene | Case 5 Ethylene |
| Mol. Wt.[1] of hydrocarbon | 13.0 | 16.0 | 14.18 | 13.01 | 14.016 |
| Mols Burner/ Gas/C atom | 1.497 | 3.000 | 2.0835 | 1.50 | 2.00 |
| Heat of Decomposition[1] | −5.69 | +17.89 | +2.282 | −3.303 | −6.248 |

TABLE I-continued

| Type of burner fuel: | Case 1 Cycle Oil | Case 2 Methane | Case 3 Naphtha | Case 4 Benzene | Case 5 Ethylene |
|---|---|---|---|---|---|
| Converter Fuel Consumptions | | | | | |
| of hydrocarbon, Kcals per mol. (+ = Endothermic) | | | | | |
| Fuel consumption, mols.[1]/mol. of iron as steel. | 0.270 | 1.046 | 0.394 | 0.313 | 0.394 |
| Fuel: wt. % of steel made | 6.29 | 30.0 | 10.0 | 7.31 | 7.63 |
| Oxygen Consumption: mols per mol of iron as steel | 0.165 | 0.759 | 0.259 | 0.192 | 0.197 |
| Oxygen: cu. ft./ton of steel | 2340 | 10750 | 3670 | 2710 | 2740 |

Note 1: fuel data is expressed on the basis of a hypothetical hydrocarbon $C_1H_x$ (i.e. benzene as $C_1H_1$) for case of calculation.

The fuel consumption for the X-type fuel cycle oil is only 26% of that required when using methane as fuel, while the oxygen consumption is only about 15% higher than that required for the BOS method of producing steel.

It is more efficient to recover and utilise the off-gases from a steel converter as completely as possible, for instance by using the process described in my British patent specification No. 1,369,595, preferably by using the gastight joints of the type described in my British patent specification No. 1,513,549 for joining the converter to the gas recovery system. However, for small steel works, and for existing converters it is economic to have a simple type of gastight joint which can be fitted to an existing converter, and for which means for provided so that the converter can be easily opened and closed again so that a melt can be poured and the converter recharged again by known conventional means already in existence. The said simple gastight joint comprises an annular chamber fitted around the off-gas outlet nozzle of the converter with the lower part of the chamber sealed to the nozzle and the upper part open to the atmosphere. The off-gas pipe to the equipment utilising the gas is equipped with a bell shaped nozzle which fits inside the annular chamber, and which can be guided into it by means provided for it. The lower part of the said chamber consists of an annular flat plate welded or sealed to the converter nozzle which is fitted with an annular compressible high temperature gasket, or alternatively with a plastic sealant paste suitable for high temperatures consisting of a mixture of, for example, short fibres of asbestos, ceramic wool such as Triton or glass wool, capable of withstanding the moderate temperature within the said chamber; graphite or colloidal silica as a lubricant and a high temperature grease or asphaltic material which acts as a binder to form the plastic paste. The bottom of the said bell and the surface of the base plate are preferably machined with fine vee shaped grooves, which together with the gasket or said sealant paste form a gastight joint suitable for moderate pressures. The inner side of the gas outlet nozzle is insulated by the customary refractory lining, and the outer surface of it insulated with a high temperature and low conductivity insulating material such as alumina or porcelain fibres (Saffil/Triton), with a metallic retaining jacket, to reduce heat transfer into the annular chamber into which the bell fits, so that the temperature therein is maintained at a sufficiently low level which the gasket or said sealant can withstand. This is preferably assisted by injecting a coolant gas into the inner side of the annular chamber, preferably one which can react with the off-gases from the converter to give a reducing gas on mixture therewith, as described in, for example, my British patent specifications cited above. Auxiliary cooling can be provided for the said annular chamber if desired, for example an exterior fluid cooled jacket, or radiating fins, but normally this is not needed, as injection of coolant gas into the chamber is sufficient. The use of water as a coolant fluid is not recommended, because of the danger of explosion in the event of leakage and mixture with molten steel. Means are provided to hold the two halves of the joint in contact, comprising matching flanges attached to the gas bell and the outer wall of the said annular chamber which are held together by, for example nuts and bolts in the customary manner, preferably spring loaded and tightened or slackened by remote control torsion wrenches in the known manner, hydraulically or otherwise.

However, even for converters already equipped with means for tapping and transporting the slag and steel in existing installations, it is preferable to provide improved means for the purpose to avoid, or minimise, the opening and closing of the converter with its adverse effect on the converter lining and interruption to the off-gas recovery potential. The said improved means can be provided by extending the method disclosed in my British patent specification No. 1,369,595 for feeding hot metal to the converter, without having to open it, to the tapping of the slag and metal. The said improved means comprises a conduit or pipe, fitted to the converter either exteriorly or internally, the lower end of which extends into the melt, respectively into the slag or metal layer as desired. The said pipe, or conduit, can be made of a suitable refractory resistant to a tack by molten slag or steel, or consist of a high melting point metal (such as titanium or molybdenum) which is clad inside and out by a suitable refractory, so that the material will not be attacked or alloyed by molten steel. Two or more such pipes can be installed to tap steel and slag separately, and the pipes may be raised or lowered, to tap the desired layer, through a gastight joint as described in my British patent specification No. 1,513,549. Means are provided for causing the slag or molten metal to flow through the said pipes by applying a differential pressure across its two ends, either by applying a sufficient pressure within the converter (by restricting the off-gas flow) or by attaching a vacuum ladle to the outflow end of the said pipe end. Alternatively, means can be provided to tilt the converter to cause the melt to flow through the said tubes, and a 'gaslift' can be used in the said tubes by providing a stream of inert gas such as nitrogen or carbon monoxide through a tube inserted in the said pipe, which bubbles through the melt in the pipe thus reducing its hydrostatic head. A simple and preferred method of tapping steel or slag through the said pipes is to use a special design of vacuum ladle, equipped with a stopper and tube on the bottom of the ladle. The said tube is then introduced into the said tapping pipe and the melt sucked up by opening the stopper, into the ladle. Means are provided for guiding the said tube into the said pipe concentrically to avoid any mechanical strain on the tube. One advantage of the use of the said special vacuum ladle, and of the use of an inert gas lift, also applicable to the ladle, is that the molten steel can be simultaneously degassed.

A further improvement to a fuel fired converter, or a melting furnace for metals, is the use of a special design of oxy-fuel burner, either for partial combustion or for complete combustion, in which means are provided for using the hydrocarbon stream as fuel, and any air used for combustion (but not pure oxygen because of its reactivity at elevated temperatures) as a coolant for the outer wall of the burner tube and its tip. The burner comprises, for example, a central pipe through which the burner oxygen or oxygen/air is supplied, and the hydrocarbon fuel is fed to the burner tip, where combustion with the oxygen occurs, via three concentric annular spaces surrounding the said central pipe. In the first annular space the fuel flows downwards towards the tip, in the second it flows upwards and in the third it flows downward again (with the outer wall of this space forming the outer wall of the burner) into the burner tip for combustion. The outer wall of the burner pipe can be insulated by a refractory layer, in order that the fuel temperature will not exceed the level at which coking will occur, and the exterior wall of the central oxygen pipe can also be insulated to limit the temperature of the oxygen. The pipes and annular partitions within the burner equipment can be constructed of steel, preferably alloy steel to resist corrosion/oxidation or of a high melting point metal such as titanium or molybdenum. The fuel can be preheated and vapourized before it is fed to the burner, and the burner can also be fed with a powdered solid carbonaceous fuel, for example coal, coke or breeze, fluidised in a stream of a combustible hydrogen containing gas, such as hydrogen or a hydrogen concentrate, or a vapourized hydrocarbon such as naphtha or methane (natural gas). This novel design of a fuel cooled burner avoids the explosion danger inherent in a water cooled burner, and is thermally more efficient, as it avoids loss of heat in the coolant.

When a solid particulate feedstock is added to a steel converter (such as iron sponge, scrap metal, metallic oxides or flux) fuelled by an oxy-fuel burner (complete or partial combustion) or an oxygen lance, I find it is advantageous to provide means for feeding the said particulate feedstock as far as possible as a curtain of falling particles surrounding the burner flame. An oxygen lance can also be used to a limited extent acting effectively as a 'reverse combustion' carbon monoxide burner, with the oxygen burning in the carbon monoxide furnace atmosphere, releasing heat by the combustion. The falling particles are preheated by the intense thermal radiation from the flame, protecting the converter lining, and tend ultimately to melt and agglomerate together. The particles are entrained in the envelope of reducing gases from the said atmosphere of the converter, which is drawn downwards towards the melt surface by the high kinetic energy of the burner gases, and spread out over the melt surface together with the burner gases impinging on it. The agglomeration and melting of the particles there are faciliated by the reducing nature to wustite of the gases in which they are entrained which inhibits the formation of iron oxide slag. I find that in this manner, even when using a relatively finely divided metallic feedstock, the loss of fumes and dust from the converter is minimised and a high steel yield is obtained (Example 3).

A further optional improvement is to add an external refractory venturi throat to the burner or oxygen lance tip to enhance the natural entrainment of the converter's hydrogen carbon monoxide atmosphere by its action thus reducing the 'E-ratio' of the gas mixture formed which impinges on the melt. Not only does the said venturi throat increase and stabilize the flow of gases impinging on the melt surface but it also controls their oxygen potential (H-ratio), and minimises or prevents the formation of wustite thus enhancing reaction of the gaseous oxidants with the melt impurities instead. For a converter operating in accordance, for example, with the method described in my British patent specification No. 1369595, the H-ratio (water vapour:hydrogen) of the burner blowgases is above the limit of about 0.42 at which free wustite can be formed at the start of the blow. The said ratio is then decreased either progressively or by stages as the blow continues so as to obtain controlled operation to finish the blow with a low H-ratio and thus a low iron content slag. Thus a more favourable operation results when using the said Venturi throat to control the oxygen potential of the blowgases impinging on the melt surface in the manner described. The reducing gas atmosphere inspirated by the Venturi throat dilute the oxidant content of the burner gases proper reducing their oxygen potential, so that a higher H-ratio can be maintained for them than the maximum of around, say, 0.42 as dictated by the thermodynamical relationship for the reaction:

$Fe + H_2O \rightleftharpoons FeO + H_2$ namely:      Equation 1

$K = (a_{FeO} \times p_{H_2})/(a_{Fe} \times p_{H_2O})$,      Equation 2 where K is the equilibrium constant for the reaction, $a_{FeO}$ and $a_{Fe}$ the activities of wustite and iron respectively in the melt, and $p_{H_2O}$ and $p_{H_2}$ the partial pressures of water vapour and hydrogen in the gas stream impinging on the melt surface. In this manner the use of the Venturi throat permits the production of burner gases having a higher oxidant content, and therefore a higher heat release, than would be possible without it, throughout the duration of the blow as the oxidant content of the blow gases are progressively reduced as described in the said British patent specification. Similar considerations will apply to the use of a Venturi throat with an oxygen lance in, for example, the Basic Oxygen steel ('BOS') process, in which the aspirated carbon monoxide gases comprising the bulk of the converter atmosphere dilute the oxidant content of the lance combustion gases impinging on the melt surface giving an improved, but not perfect, approach to a similar thermodynamical control for the carbon species to that shown for the hydrogen species in Equation 2. The use of the said Venturi throat in this manner is equally applicable to any type of steel converter, using an oxy-fuel burner (for complete or for partial combustion) or any oxygen lance, whether a solid particulate feedstock is being added to the converter or not.

I find that a further improvement in the thermal efficiency of any type of steel converter can be achieved by decreasing the heat losses from it by using a multiple layer construction for the refractor insulating lining of the converter. The present method of their construction comprises an outer steel shell with an internal lining of refractory brick, for example magnesia brick and/or a rammed lining of magnesia/tar. New, highly efficient, insulating materials have been developed, for example ceramic or Alumina fibres (such as Morganite Triton Kaowool and Saffil) which have an average heat conductivity over the steel making temperature range of only one tenth that of magnesia brick. These materials can also be used up to 1200°–1600° C. Unfortunately, they have relatively poor load resistance, and therefore have not hitherto been used to improve the insulation and reduce the heat losses of steel converters. I find that this difficulty can be overcome by providing means for relieving the said highly efficient insulation from the compressive load of the weight of the melt and lining, and thus benefit from their reduced conductivity:

TABLE II

| Material | Thermal Conductivity BTU/(hr.) (sq. ft.) (°F.) (in.) | Use Limit Temperature Degrees maximum-Centigrade |
|---|---|---|
| Silica Brick | 14.3 | 1700° C. |
| Magnesia Brick | 18 | 2300 (oxidising)–1700° C. |
| Fireclay Brick | 10 | 2500–2800° C. |
| Ceramic Fibre (Triton) | 1.0 | 1260° C. |
| Alumina Fibre (Saffil) | 2.5 | 1600° C. |

The said means comprise the use of two or more concentric metal vessels of which the inner is the normal converter with a lining which resists attack by the melt, of the normal type, say, magnesia brick, and the outer vessel is a retaining shell for the high efficiency insulation. The weight of the melt charge and the converter lining is supported either by the normal trunions or lugs and supporting framework, or by providing supporting thrust bearings within the said outer shell which support the weight of the converter and transmit it to the foundations of the converter assembly. The said thrust bearing have a relatively small area of contact with the inner converter shell and are constructed of high strength relatively low conductivity material so that heat losses through them are minimised. The said lugs or trunions are attached to the upper part of the converter, which being in the cooler gas phase portion of it can be more readily equipped with high efficiency insulation, and/or equipped with a gas cooled jacket, for example similar to that described above for the converter outlet nozzle. The converter metal shell (inner) is designed to operate with a temperature which does not exceed the long-term creep stress permissible for the material of which the converter shell is constructed, nor the maximum temperature beyond which excessive oxidation will occur. The said material can consist of a steel or alloy steel, or a high melting point metal such as titanium, meeting these requirements, the temperature being limited to the range of about 600° C.–1050° C. maximum according to the metal chosen. The magnesia or other refractory lining of the converter can be also bedded on a relatively thin layer of the highest grade refractory, preferably precompressed, such as alumina fibres (Saffil), which can stand a maximum temperature of 1600° C., the said thin layer compacting under the weight of the converter charge and refractory lining, and while losing part of its efficiency as a result will still contribute to lowering the temperature of the inner converter wall by decreasing the heat flux to it. An important feature is that the magnesia lining in an oxygen blown converter suffers from increasing attack by the melt as its temperature in contact with it exceeds 1500° C. by any considerable margin. The controlled oxidation process of, for example, my British patent application No. 1369595 is particularly suitable for use with the said improved converter design as the controlled operation ensures that the slag has a low iron oxide content and that the melt temperature can be maintained at a reasonable and steady temperature, both of which factors reduce refractory attack. At the same time the slag resulting from the process of my said British patent application (conveniently referred to as the 'SS process') even when producing a low carbon, sulphur and phosphorous content steel has a relatively low melting point, as the ratio of calcium oxide to silica 'Vee ratio' in the slag can be held down to a range of about 0.5 to 2.5, and preferably 1.0 to 2.0 as described below (Example 6). When basic oxides other than CaO are used in the charge the modified Vee ratio $(CaO+Al_2O_3+MgO)/SiO_2$ can be used for control. The improved insulation in the said improved converter decreases the heat flux through the magnesia insulation layer, compared with that in an oxygen blown converter design, which increases somewhat the surface temperature of the magnesia refractory lining in contact with the melt, and this is compensated for by the said effects of the controlled SS process operation. The inner metal shell of the converter is surrounded concentrically by the outer shell (or jacket) and the annular space between the two shells is filled with high efficiency insulation such as ceramic or alumina fibres, such as Triton and Saffil, and the thickness of this insulation is fixed so that the temperature of the said inner shell does not exceed the temperature maximum for the material of which it is constructed. The use of the said high efficiency insulation reduces the thickness of the magnesia refractory lining of the inner converter shell to about one half to one quarter or less of that needed for the present type of conventional converter, while the thickness of the high efficiency insulation between the inner and outer shells is much less still, being only of the order of one fifth to one third that of the inner magnesia refractory layer, the exact dimensions depending on the actual heat conductivities for the respective insulations chosen and the material of which the converter shell is constructed. This said novel converter design can be applied to existing steel converters by reducing the thickness of the existing magnesia (and/or other type of lining) refractory to about 50–60% of its present value, and adding a layer of high efficiency insulation, for example of the ceramic fibre type such as Triton, around the body of the converter held in place by a metal retaining jacket. The thickness of the high efficiency insulation is fixed so that the temperature of the converter shell does not exceed about 500°–600° C., which can be accepted provided the shell is of sound construction suitable for operation at this temperature. Adaptation of existing converters in the manner described has the advantage of increasing appreciably their melt capacity because of the reduced thickness of the insulation, as well as cutting heat losses to about half the conventional figure.

These improvements make viable the processing of lower grade iron ores having a higher gangue content than that which could previously be handled economically, particularly in those cases where the nature and structure of the ore makes it unsuitable for benefication to concentrate their iron ore contents. The use of an X-fuel, the utilisation of converter gases for reduction of the ore (after regeneration using a hydrocarbon quench), and the reduction in the equipment heat losses resulting from the use of the improved converter design utilising high efficiency insulation can all be combined to reduce fuel consumption to a reasonable level. At the same time the SS process produces a low carbon, phosphorous and sulphur content steel when operating with a low calcium oxide to silica ratio in a range of about 1.0 to 2.0 (the so-called 'Vee Ratio') for the slag, instead of the normal BOS figure of around 3.0. This advantage is presumably due to the improved contact with gaseous oxidants in the SS process and the blow continuing right to the end of the melt. The said low Vee ratio needed for the slag (Example 6) reduces the consumption of calcium oxide flux, to around 35–65% of the BOS figure, with a corresponding reduction in the amount of slag production, while at the same time the low Vee-ratio gives a relatively low melting point and mobile slag consisting mainly of calcium silicate ($CaSiO_3$) reducing cost and disposal problems. This feature will become increasingly important as deposits of high grade iron ore become exhausted. The ability of the SS process to handle scrap metal as a high percentage of the converter charge, is an added advantage when processing low grade ores, as it reduces the overall production of slag which has to be handled.

A combination unit producing steel from ore in one operation is the most efficient, for example the use of the combination SS process of my British Patent specifications Nos. 1213641, 1369595 and others. However, the construction of entirely new plant for the purpose is expensive, and existing plant can be adapted for the purpose, or a more simple design of equipment used. Thus, instead of the construction of a complete new direct reduction plant for processing iron ore, the greater part of the potential heat and reducing power of the off gases from a converter can be recovered by equipping the converter with a simplified recuperator for the purpose, which recovers the bulk of the said potential at low cost. While the said recuperator can be used with new plant, it is particularly suitable, as an alternative to a full scale direct reduction unit, for the preheating and reduction of metal and ore charge to an existing converter, when used in conjunction with an improved type of steel converter operating with the SS method and using the improved methods of using an X-fuel for firing the converter, insulating it, and equipping it with means for utilising the off-gases in the recuperator by means of a gastight joint or joints as described. The said recuperators can be one or more in number and be operated also as batch or semi-batch units, in which the metal feedstock is preheated before being fed to the converter and any ore content reduced to the desired degree to form iron sponge. The recuperators are fitted with a movable choke at the gas feed end, to retain the solid charge when preheating, and to regulate the flow to the converter. Preferably two recuperators are employed, which can be operated alternately in parallel, or manifolded to run in series. For the said alternate operation the charge of one recuperator is being preheated and prereduced by means of an auxiliary burner, while the second recuperator is fed with superheated gases from the converter, via the gastight rotary joint to complete the reduction of its ore content to the desired degree and feeds the preheated and reduced charge to the converter, until the addition of the batch is completed. The roles of the two recuperators are then reversed, the second one being recharged with metal/ore feedstock and preheated and prereduced by the reducing gases from the auxiliary burner; while the first one is fed with gases from the converter to complete the reduction to the desired degree and feeds the solid feedstock to the converter at the desired rate. This cycle of operations is continued indefinitely. The temperature of the recuperators is raised to, and maintained in the range of, say 700°–1100° C., and preferably 850°–950° C. to avoid 'stickiness' in the burden while attaining an adequate rate of reduction. The cycle timing and feedrate to the converter are determined by the gas analyses from the off-gases of the converter and the said recuperators, as well as the operation of the auxiliary burners, located in the recuperator gas inlets. The said auxiliary burners can be operated initially on full combustion conditions if the metal ore feed to the first recuperator contains no iron sponge, and the progressively switched to partial combustion operation, to yield reducing gases, when the outlet carbon dioxide/water vapour content of the exit gases from it falls to a point indicating that the iron charge in the recuperator has started to oxidise (equilibrium H-ratio, approaching 5.2 for magnetite). The said auxiliary burner then continues to operate on partial combustion conditions until the reducing gases produced have produced sufficient reduction of the wustite to iron sponge (equilibrium H-ratio about 0.35 for wustite) as indicated by its off-gas composition. The first recuperator is then switched to become the feed vessel to the converter, with the superheated reducing gases from the converter acting as reducing gases to reduce the charge to the desired degree of metallisation for feed to the converter. The gases from the converter can be regenerated by converting any carbon dioxide/water vapour to carbon monoxide/hydrogen, by using a small hydrocarbon quench stream for the purpose, and in addition part of the off-gases from the said recuperator can be recycled also to its gas inlet, and similarly regenerated, so as to obtain the desired degree of reduction of the ore. The amount of the said gas recycled, and the amount of fuel fed to the auxiliary burner are controlled so that the temperature of the solid feed to the converter is maintained at the same temperature range as specified above for both recuperators, and its rate of feed to the converter controlled so that the off-gases from the converter do not exceed the H-ratio at which gross wustite formation can occur in the converter (about 0.42) and preferably have an H-ratio not normally exceeding about 0.1 to 0.2 at the end of the blow so that the wustite content of the slag produced will be reasonably low. These considerations apply to any given fuel and oxygen or oxygen/air feed rate to the converter burner which is operated as discussed above to give the maximum heat release and oxygen potential to give these conditions simultaneously with the said control of the solid feed rate to the converter, as normally applies for a converter operating with SS conditions as described in my cited British patent specifications. The solid charge to the recuperators can comprise scrap metal, iron ore as such or as pellets or sinter, millscale, iron sponge, alloy constituents, and flux as desired whether as such or partly present in the ore or other solid feedstock and metallic oxides and alloying constituents as required to meet the specification of the steel batch in preparation. The recuperator can consist of a stack reaction vessel or a rotary kiln, the former being more suitable for larger size particles, and the latter for more finely divided feedstocks. If a rotary kiln recuperator is chosen it is preferably equipped with baffles to improve contact of the gas phase with the solid phase as the gases pass through the vessel. The said baffle assembly comprises a sequence of gastight, or substantially gastight baffles spaced along the axis of the vessel, and at right angles to it. Each of the said baffles has a portion cut out of it to permit the passage of the kiln gases and of the solid burden through the aperture when it is at its lowest point in the rotating vessel, so that the gases are forced to pass through the bed. The baffles, which rotate with the vessel, are arranged in a spiral pattern, for example if this is set at 180 degrees staggering of successive baffles apertures, then in the successive compartments formed between two baffles the gases will be forced through the moving bed when the said aperture is at its lowest point, and in the next compartment where the aperture is at its highest point only gases will pass through the aperture, and so on. As the vessel turns on its axis, the ore burden slides within the rotating vessel at an angle which obstructs the aperture as it rises towards the top again forcing the gases through the burden. On the opposite side of the kiln the sliding bed does not obstruct the aperture in the next baffle so that the gases pass through it, the overall effect being that for nearly half the time the gases are forced to pass through the ore burden improving contact and reaction rate. The said aperture can have any shape, but is preferably a segment cut off the circular baffle, bounded by a chord whose height is determined by the kiln inventory it is desired to maintain. Alternatively, instead of the said segment, holes can be drilled in that portion of the baffle with larger holes near the circumference, and the others decreasing in size away from it (see FIG. 5—alternative 2). Not only is the reaction rate increased, but also the kiln inventory, so that residence time is improved, and the size of the recuperator or rotary kiln reduced.

If maximum energy recovery is required, then the off-gas from the recuperators can be fed into the furnace of a steam boiler so that the off-gases can be burnt with (secondary) air to recover their potential heat capacity completely. The said boiler can be equipped with a stack blower so that the pressure in the recuperators and converter can be held down to substantially atmospheric pressure. As the potential heat capacity of these said off-gases will vary during the course of a converter blow, or even be interrupted when it is 'off-blow' the boiler furnace can be equipped with one or more auxiliary burners which are automatically controlled to maintain the boiler load at the desired level, using conventional means. The use of a recuperator, or of a full scale direct reduction unit processing iron ore in this manner, means that it is effectively used as a 'chemical reaction burner', in which the fuel is burnt with partial combustion to produce mainly carbon monoxide/hydrogen, while at the same time the ore, which can also be other than an iron oxide ore, is reduced wholly or partly to metal. The combustible gases from the said 'chemical reaction burner' are then burnt preferably after washing to remove dust, with complete combustion, using secondary air for the purpose, in the combustion chamber of the boiler. This method of operation is very efficient thermally as the energy content of the fuel available is fully utilised, with the only losses being the heat losses from the equipment including the steel converter, and the stack losses of heat in the combustion gases from the boiler, the sensible heat from which can be partly recovered by using it for preheating combustion air or, feedstocks, in the customary method. The overall thermal efficiency of such an operation jointly producing steam and steel will be in the range of 85-90% of that theoretically possible. Steelworks are normally large consumers of steam or electricity, which can be generated using the steam produced, so that the use of the said 'chemical reaction burners' in this manner for general metallurgical processes handling iron ore or ores of other metals is attractive, and can be also incorporated in existing plant.

In order to utilise the off-gases from a 'chemical reaction burner' it will be advantageous in some cases, where the feedstock used for the metallurgical process is dusty and gives rise to entrained particles in the gases, to provide means to remove the dust for environmental reasons or to prevent deposit in the said boiler furnace, or other furnace, in which they are used. The normal methods of using a water spray and/or electrostatic precipitation can be used, but these possess the respective problems of the disposal of the contamined water and high cost, while the hot gases have to be cooled to substantially atmospheric temperature. I find that an improved method is preferably first to pass the gases through a conventional cyclonic dust separator and then to provide means to wash the dust out of the hot gases using a hot stream of a high boiling point petroleum fraction for the purpose, such as hot asphalt, tar, bitumen or any other high boiling point petroleum fraction. The said means for washing the gas stream is a wash column of conventional design, using baffles, bubble trays, packing and/or sprays of the recirculated hot petroleum fraction, and equipped with means for recirculating the hot bitumen. As entrained oxide dust, and ash from the fuel, accumulates in the recycled petroleum fraction, a small split stream of the said petroleum fraction is removed from the system and replaced by fresh fluid so as to maintain a sufficiently low build up of dust thus preventing deposits forming in the equipment. The removed split stream containing iron oxide can be used as a binder for the preparation of sinter, pellets, briquets or for other appropriate industrial use. The hot washed gases resulting are particularly appropriate for the production of hydrogen or a hydrogen concentrate by means of the known 'shift reaction', followed by absorption of the $CO_2$:

$$CO:H_2O = CO_2 + H_2 \qquad \text{Equation 3}$$

The solvent selected for the absorption of carbon dioxide can also be chosen to remove simultaneously hydrogen sulphide, which is then stripped out of the solvent together with the carbon dioxide, so that the recovered solvent can be recycled to the absorption column in the conventional manner. The hydrogen or concentrate resulting, having a very low sulphur content is valuable for reducing high sulphur ores (and as fuel for processing steel converter feedstocks) to yield low sulphur products, as described, for example, in my British Pat. No. 1,187,781 as part of the sulphur is removed therefrom as hydrogen sulphide. The said hydrogen or concentrate is also useful as fuel for the preparation for example of very low carbon content alloy steels (see my British patent specification No. 1508591), iron powders, and as the fuel for steel converters as described in this specification either as such or as the fluidising gas for a solid fuel such as coal powder, which has the advantage that the fluidised mixture does not ignite until the burner tip is reached.

In my British patent specification Nos. 1508591 and 1508592 means were described for producing low carbon content steels by the SS method, using a blowgas with a higher oxygen potential at the start of the blow and/or by the addition of metal oxides, particularly as partly reduced iron sponge, the said potential being conveniently measured by the H-ratio, and decreasing it by the end of the blow which can be done either in stages or continuously. The oxygen potential was adjusted by the composition of the blow gas (H-ratio) and/or by the addition of iron sponge containing wustite or another metal oxide to the melt, either in the initial charge and/or during the blowtime, as described. This method gave a position at the early part of the blow in which the oxygen potential was high enough to reduce the carbon content to a low figure, but simultaneously oxidised appreciably the alloy constituents in the melt, such as chromium, which accumulated in the slag while in contrast the carbon was removed from the system as mainly monoxide. In the latter part of the blow, when the oxygen potential was lowered to a degree that the gases were reducing to, say, chromium oxide, the temporary said accumulation of that oxide in the slag was reduced again to the metal, care being taken that the said accumulation in the earlier part of the blow was kept in reasonable limits. I find (Example 7) that an improved method of getting very low carbon contents in alloy steels is to make a series of consecutive short changes in the oxygen potential of the melt, i.e. two or more, either by varying the H-ratio of the blow gases and/or by adding the said iron sponge or other metal oxide over short periods alternated with low H-ratio blow gas periods (without metal oxide addition) which is sufficiently reducing to the chromium content of the slag to reduce it to an acceptable figure. In this manner, the equilibria (thermodynamic) of the chromium, or other alloy constituents, and of the carbon is successively approached a number of times from the oxidising and then the reducing side of the equation for the said chromium and the carbon is purged as carbon monoxide from the system by the blowgas so that achievement of a low carbon content and a high chromium recovery is favoured both from chemical equilibrium considerations and those of reaction kinetics. The blowgas used in the said consecutive periods preferably has a low or nil content of gases of the carbon species (i.e. a low $P_{CO}$) and can be an inert gas such as argon, nitrogen, or hydrogen. Nitrogen is avoided in both the blowgas and all the oxidants used if a low nitrogen content steel is required. If larger amounts of oxidants are used, giving more severe operating conditions, in the periods of high oxygen potential, and are followed by longer periods of low oxygen potential 'blows' then a faster rate of carbon removal and a lower final carbon percentage will result, at the expense of slightly increased attack of the converter lining. If mild conditions are used (Example 7), using smaller amounts of oxidant in the said high oxygen potential periods, in the blowgas and/or in the metallic oxide additions, then the rate and final percentage of carbon will be lower and higher, respectively, other conditions being equal. In general the major use of a metallic oxide as oxidant, particularly in the form of partly reduced iron sponge (wustite) tends to be favoured when an electric steel furnace is used, and an SS blowgas (with a high H ratio) for a direct fired converter, because of heat balance considerations. If a strongly reducing blowgas, such as hydrogen, is used for the low oxygen potential blow periods, then a short final blow period with an SS blowgas having a low H ratio (for example, 0.05 to 0.07) is indicated to ensure a low phosphorus final percentage. The said improved method of making very low carbon steels, particularly alloy steels, is facilitated by incorporating the other improved methods described above, particularly the method for the uniform distribution of the particulate feed (iron sponge—Example 3), which gives uniform feed of the solid oxidant over the melt surface, and by the availability of hydrogen from the steel making process (Example 4), as described.

The SS process is very flexible in its use of fuels, particularly when utilising the improvements described in this Specification. A wide range of fuels can be used, both for the SS converter and for the recuperator/ore reduction unit with which it can be operated, coal, coke, breeze, char, crude oil, natural gas, petroleum naphtha/tops, distillates such as gas oil, cycle oils from catalytic cracking, fuel oils and tars. The main consideration is that they should have a suitable analysis: that is that they should not have too high an ash, sulphur or phosphorus content, and that they should preferably belong to the X-fuel group as described herein. More than one type of fuel, or mixture of fuels can be used, for example an X-type fuel can be selected for use in the converter for optimum results as described, and powdered coal preferably fluidised by hydrogen, a hydrogen concentrate or the vapours of an X-type fuel such as cycle oil, or methane (natural gas) can be used in the recuperators or direct reduction kiln. In this manner a high proportion of solid fuel can be economically used for manufacturing steel at high heat efficiency when using the SS process, provided that improved means can be provided for dealing with the problem of high ash, sulphur and phosphorus contents which may occur in solid fuels, and also in the cheaper and more readily available petroleum fuels. The problem of obtaining a reasonable ash content in the pulverized solid fuel can be met by using the known flotation method to lower the ash, and using the SS process because low phosphorus and sulphur steels can be produced by it when using slags with a Vee ratio of only 1.0 to 2.0 which reduce considerably the amount of slag produced as described (Example 6) so there is no overall increase in the slag volume. It is well known that for a given slag composition and metal melt conditions the ratio of distribution of phosphorus (and sulphur) content between the slag and the metal tends to approach an equilibrium figure and this factor has been utilised in the art by the well known 'two-slag' process in which the flux is added and the slag withdrawn in two portions. The first slag contains for example the bulk of the phosphorus, and when the second portion of fresh flux is added the remaining phosphorus left in the metal is again proportioned between slag and metal leaving a lower phosphorus content in the metal than would have been reached if the flux had been added altogether in the first place. I find that an improved means of applying this principle is to add the flux continuously while simultaneously tapping off the slag in the same manner, thus obtaining a steel product with a lower sulphur and phosphorus content than would have been achieved by the conventional method. Means that can be used for tapping off the slag in a continuous or substantially continuous manner have been described above and in Example 4. A further improved means of obtaining a low sulphur and phosphorus steel, when using a fuel containing appreciable amounts of these impurities for firing a steel converter, is to complete the blow using a different fuel containing very low amounts of the said impurities, so that the ratio, for example of phosphorus between slag and metal established when using the impure fuel, is shifted by using the pure fuel which tends to reduce the phosphorus (or sulphur) content of the slag which approaches a new equilibrium with the purer burner gases, particularly when continuous addition and withdrawal of flux and slag is used during the blow.

It is sometimes convenient to be able to recarburize easily a melt, particularly when it has been blown down to obtain a very low sulphur and phosphorus content, which is economically possible when using the said SS process. I find that this can be done, for instance by adding the appropriate small amount of a low phosphorus/sulphur content cast iron to the final melt, and I find that a further improved means is to blow the melt for a short time with an hydrocarbon stream such as methane, or naphtha tops, or a stream of these hydrocarbons diluted with carbon monoxide or nitrogen inert gas to increase gas velocity and inhibit coke formation within the lance. Carbon is formed by cracking of the hydrocarbons injected and absorbed in the molten metal, and the blow is continued until the desired increment in the carbon content of the melt is achieved.

The molten steel produced by the said SS process, using hydrocarbons as fuel for the converter burner, contains an undesirably high content of hydrogen. I find (Example 8) that if the melt is after-blown with carbon monoxide, or its mixture with an inert gas, not only is the hydrogen reduced to a low level, but that also the oxygen content of the steel is reduced to a low level and the carbon content is also reduced slightly as the result of the gases stripped out of the melt approaching the equilibrium ratio for the shift reaction (Example 8).

In order that the said improvements in the manufacture of steel may be more fully understood their utilisation is described in a number of Examples describing their embodiment, by way of illustration only and supported where appropriate by Figures which are diagrammatic only and not drawn to scale. It will be appreciated by those skilled in the art that these improvements are capable of considerable modification in detail, while still being governed by the principles disclosed herein, and that they can be used separately or in a wide variety of combinations in accordance with local process requirements, and feedstock availabilities. These improvements are particularly directed towards saving in fuel consumption, and improvements in the thermal efficiency of steel making processes. As indicated some of the said improvements can be incorporated in other steel making processes, for example, in the conventional Basic Oxygen Steel ('BOS') process:

EXAMPLE 1

Figure 1C:
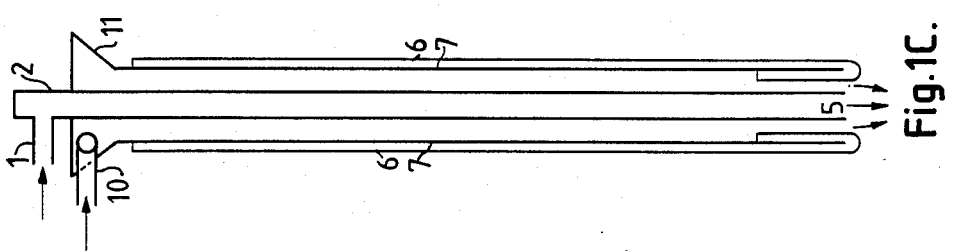
FIG. 1C illustrates a burner similar to that of FIG. 1A using, in addition, pulverized solid fuel.
Figure 1E:
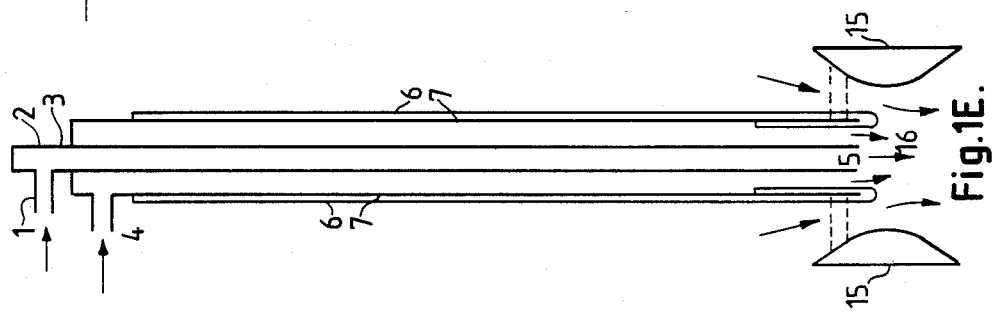
FIG. 1E is a burner similar to the above but equipped with a Venturi throat at the outlet of the burner.
Figure 1B:
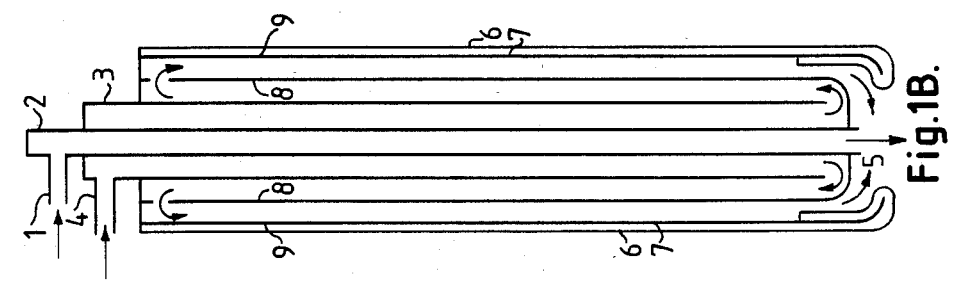
FIG. 1B is a burner similar to that of FIG. 1A, providing for improved control of the heat flux through burner walls.
Figure 1A:
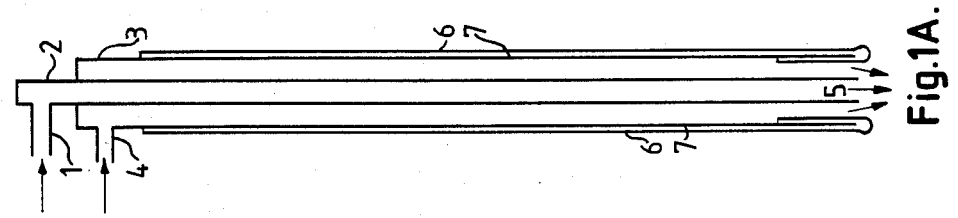
FIG. 1A illustrates a hydrocarbon burner for burning a hydrocarbon fuel with oxygen or air or a mixture of oxygen and air.

Describes an improved form of oxy-fuel, or 'partial combustion' burner, in which the burner is located in a metallurgical process vessel or furnace, for example a Steel Converter, in which the said burner walls and tip are cooled by the fuel, and oxygen or air or a mixture of them, which are fed to the burner. Details of the burner design, which can have a tip of known toroidal type, can be varied to suit the type of operation involved:

FIG. 1A illustrates a burner in which an hydrocarbon fuel, preferably an 'X-type' fuel, is burnt with oxygen or air or a mixture of them. Oxygen is fed through a nozzle 1 to a central burner pipe 2 which is surrounded concentrically by a pipe 3 into which the fuel (which can be preheated) is fed by means of a nozzle 4, and the pipe 3 is welded to pipe 2 at the top and remains open at the bottom so that both the oxygen and fuel pass downwards through respectively pipe 2 and the annular space between pipes 2 and 3 to the burner tip 5 where combustion takes place. The outer pipe 3 can be insulated by high temperature insulation 6—for example by magnesia, combined if desired with an inner layer of high efficiency insulation 7, for example, a ceramic fibre type such as Saffil and/or Triton, which can be applied in a normal manner, for example in a plastic form cured in place, or by formed blocks keyed in place on the outer wall of pipe 3 using the same principle as that applied to suspended walls for furnaces. The thickness of the insulation 6 and 7 is controlled so that the fuel stream does not exceed the temperature at which coking and blockage of the burner will result. Similarly, the heat flux through pipe wall 2 heats the oxygen passing through it, and can also be insulated if necessary to avoid the said temperature exceeding that acceptable for oxygen, say, 300° C.

FIG. 1B illustrates a similar basic design of burner to that shown in FIG. 1A but with means provided for improved control of the heat flux through the burner walls. The said means comprise the addition of two extra concentric pipes 8 and 9 with the oxygen flow downwards through pipe 2, and the fuel down the annular space between pipes 2 and 3 and upwards between the annular space between pipes 3 and 8 and finally downwards between pipes 8 and 9 to the burner nozzle 5, the lower part of the pipe 8 being welded to pipe 2 and the upper part of pipe 9 to pipe 3 to form the consecutive annular passages.

FIG. 1C: If pulverized solid fuel, for example coke or coal is to be used, it is fed through nozzle 10 into the customary mixing chamber 11, preferably tangentially, where it is entrained in the stream of hydrocarbon or hydrogen fuel (preferably X-type fuels) fed through the same nozzle, the burner for example otherwise being of the design shown in FIG. 1A, with the subsequent fuel and oxygen stream flows as there described.

FIG. 1D illustrates a similar design of burner to that described for FIG. 1A, but with means provided for the addition of a reactant gas stream or a quench stream, in the upper part of the metallurgical vessel in which the burner is located. The said means comprise an extra pipe 13 and gas feed nozzle 12, the former terminating at the upper part of the burner assembly, so that the gas passes through the annular space between pipes 13 and 3 and is discharged 14 into the upper space of the said vessel at right angles to the axis of the burner. For example, if the vessel is a melting vessel, or a steel converter, oxygen, air or a mixture of these can be fed through nozzle 12 and acts as a secondary oxidant for the complete combustion of the off gas before it leaves the vessel. As a further example, the gas fed through nozzle 12 can be a reactant or quench gas, in the case of a steel converter, so that the off gases from the converter containing carbon dioxide/water vapour can be reacted with a hydrocarbon quench gas and simultaneously quenched to a suitable reaction temperature for the said reaction, for example around 1300° C., forming a reducing gas as the off-gas leaves the converter.

FIG. 1E: Any of the above burner designs, or any normal type oxy-fuel burner or oxygen lance, can be equipped with a venturi throat 15 located at the outlet end of the burner, and designed to aspirate the atmosphere within the steel converter, in which the said burner or lance is located, and to mix it with the burner flame or lance gases 16, which impinge upon the melt surface within the converter before they contact it. In this manner the oxidation potential of the gases reacting with the melt is reduced, giving a lower H-ratio (ratio water vapour:hydrogen), because the converter atmosphere consists essentially of carbon monoxide/hydrogen with only minor percentages of carbon dioxide/water vapour, thus permitting a closer control of the refining reactions and an increased heat release from the burner because the H-ratio of the burner gases themselves can be correspondingly increased. The venturi throat 15 is constructed of cast refractory, or of a high melting point metal such as titanium clad with refractory, the assembly being keyed onto the burner outer pipe 3 as an integral assembly with its insulation 6.

EXAMPLE 2

Describes operational and equipment improvements to improve the heat efficiency of steel converters operating with an oxy-fuel burner in particular, for example the process described in my British Patents covering the 'SS Process' such as British Pat. Nos. 1369595 and 1508501/2. The said improvements can be utilised individually or in combinations of two or more of them, and one such combination is illustrated as an example only in FIG. 2, and described below. Converter heat losses are reduced by using a multilayer insulation construction, in which a main (inner) converter shell 1 is lined with a customary refractory 2, for example magnesia brick, and an outer shell 3 is equipped with a lining of high efficiency insulation placed between shells 1 and 3 for example of the porcelain fibre type 4, for example of Saffil or Triton or combination of these. If the full weight of the converter shell 1 and its contents is not supported by trunions 5, then spacer thrust bearings 6 fabricated of low creep rate steel at high temperatures are provided to take the weight and prevent the crushing and distortion of the relatively low strength insulation 4 by maintaining the position of shell 1 relative to shell 3 and the distance between them. In this case the area of the point of contact of the spacer thrust bearings 6 with the inner shell is kept small to decrease the heat losses, and the wall thickness of the outer shell 3 is designed to take the weight of the converter and contents, and the said spacer thrust bearings are attached to the inner surface of the shell 3. On the other hand, if the said weight is supported by the trunions 5, then the outer shell 3 can consist of a light weight jacket, bolted together. Both trunions and the said spacer thrust bearings can be used together. This method for using multilayer high efficiency insulation can be employed in other metallurgical vessels, such as reduction kilns, roasters etc. If a gastight converter design is desired, so that the off-gases from it can be recovered and utilised, and the converter can be easily opened for the pouring of the melt, then the upper neck of the converter shell 1 is equipped with a flanged concentric trough 7, fixed to the neck for example by welding, the outer surface of the said neck being preferably provided with a layer of high efficiency insulation, for example of the porcelain fibre type (Triton), the insulation 8 being retained by a steel jacket 9 around it. To permit the recovery of the off-gases a moveable bell 10 is provided which together with the trough 7 forms a simplified form of the gastight joint described in my British Pat. No. 1,515,549 sealed by a gasket or sealant plastic paste or plastic packing 11. The said gastight joint assembly is tightened by conventional bolts, for example claw ended swivel joint bolts 12 (details not shown) indicated in FIG. 2, which are mounted on the bottom flange of the bell 10 and spaced evenly around it. The said bolts include a threaded portion so that they can be tightened automatically to the desired bearing pressure on the seal or gasket 11 by means of the usual air or electrically operated torsion wrench. A cooling and/or reactant gas can be introduced through nipples 14 into the space between the said upper neck of converter shell 1 and the inner wall of bell 10 to maintain the temperature there at a safe operating temperature for the gasket the said cooling gases passing into the nozzle 16 for the flow of off-gases from the converter. The said reactant cooling gas can be, for example a hydrocarbon stream and/or recycled off-gas from an ore reducing plant, which react together with the converter off-gas to form a reducing gas consisting essentially of carbon monoxide and hydrogen at high temperatures, preferably in the range of 1200° to 1300° C., at which the reaction is rapid.

The said removable bell 10 is equipped with means for inserting a movable lance or oxy-fuel burner 13 through a gastight joint assembly and nozzle 15 equipped with a coolant gas stream fed through nozzle 14, the said assembly being similar to that described in my cited British Pat. No. 1,513,549, and also with a nozzle 16 for removal of off-gas from the bell through line 23. Conventional means (not shown) are provided for guiding and raising/lowering the bell 10 and swivelling it clear of the converter shell 1, and special means for permitting the off-gas line 23 to remain attached to a fixed nozzle 17 through which the gas can be delivered to a system in which it can be utilised, such as an ore reduction unit. The said special means comprise three rotary gastight joints, for example, 18, 19 and 20 of the rotary type described in my British Pat. No. 1,513,549, equipped with cooling gas nipples 21, which are capable of rotation in a vertical plane and a fourth rotary joint 22 capable of rotation in a horizontal plane, rotary joints 18 and 22 being attached respectively to nozzles 16 and 17, and joined together by the assembly of pipes 23 and joints (rotary) 19 and 20. Rotary joints 18, 19 and 20 permit (in conjunction with the linking pipes 23) the bell to be raised vertically until it clears the converter shell 1, and then rotary joint 22 permits the bell to be swivelled horizontally clear of converter shell 1 permitting access to it for charging or tapping, and two or more converters can be serviced in this manner by the said assembly of pipes and rotary joints to supply gases to the fixed nozzle 17 feeding the gases to for example an ore reducing plant.

Figure 2:
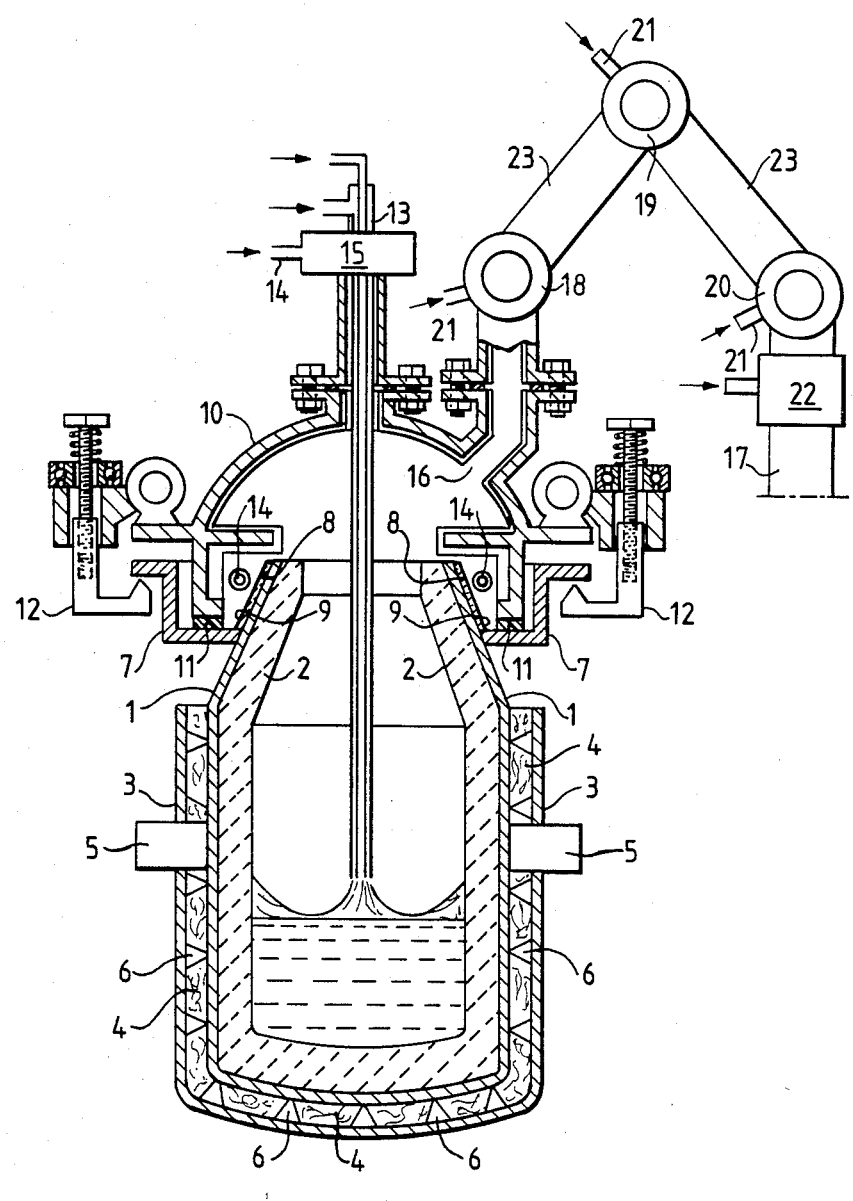
FIG. 2 illustrates a combination for providing operational and equipment improvements in steel converter operating with an oxy-fuel burner.

For example, in the particular case illustrated in FIG. 2 the oxy-fuel burner 13 consists of a partial combustion burner of the type illustrated in FIG. 1A. The reactant cooling gas fed through nipples 14 to the bell sealing joint, consists of a hydrocarbon stream/X-type fuel mixed with off-gases from an ore reduction unit (optional), forming a 'quench' stream which reduces the temperature of the converter off-gases to, say, 1300° C. as they enter the converter neck and bell 10, and react with them to form a reducing gas consisting essentially of carbon monoxide/hydrogen with preferably a small excess of the said hydrocarbon. The reactant cooling gas fed through nipples 14 is preferably controlled in flow rate and temperature so that the gases leaving bell 10 are not below 1300° C., while the coolant gases fed to nipples 21 for cooling rotary gas joints 18, 19, 20 and 22 are similarly controlled preferably so that the temperature of the reducing gases entering the ore reducing system through nozzle 17 is within the temperature range from, say, 1200° C. maximum to that required for the ore reduction, usually within the range 1050° to 800° C. (see also Example 4).

EXAMPLE 3

Figure 3:
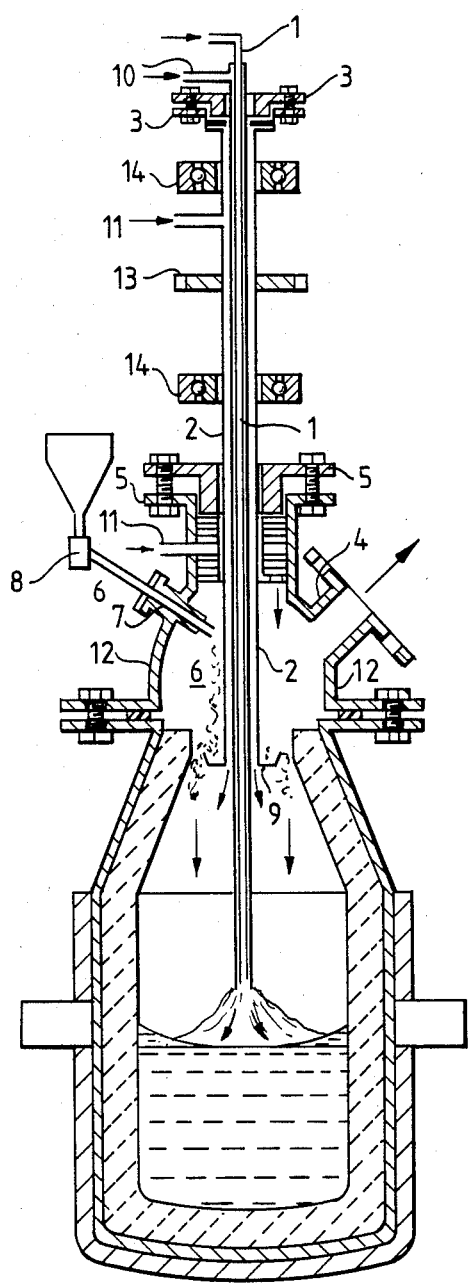
FIG. 3 illustrates an improved method of feeding a particulate solid feedstock to a steel converter fired by an oxy-fuel burner or lance, where the solid feedstock is supplied as a concentric curtain of particles around the burner and burner flame.

This example, illustrated in FIG. 3, comprises an improved method of feeding particulate solid feedstock to a steel converter fired by an oxy-fuel burner or lance in which means are provided for the said solid feedstock to be supplied to the converter as a concentric curtain of particles around the burner and burner flame, as far as possibly continuously so as to preheat the said feedstock and protect the converter lining from excessive heat radiation from the flame. The said means comprise an inner oxy-fuel burner 1 clamped in position, and provided with an outer tube 2, capable of rotation, and equipped with a stuffing gland assembly 3 comprising a stuffing gland with bolts for adjustment, packing and a packing retaining base plate. The outer tube 2 is supported by two bearings 14, and rotated by an electric motor with drive gear assembly 13 mounted rigidly on a bell assembly 12 (details not shown). The top central nozzle of said bell 12 is equipped with a second stuffing gland assembly 5, so that the tube 2 can rotate within the said assembly 5, while the said nozzle and burner 1 remain fixed. The tube 2 together with nozzle and bell 12 forms an annular space 6 into which the said solid particulate feedstock is supplied through a feed nozzle 7 by known means, for example by star feeder 8 from a hopper. The solid particles fall onto a rotating disc 9, sealed onto and mounted centrally on the end of rotating tube 2, and are thrown off it in random distribution by centrifugal force to fall as a curtain of particles surrounding the burner and flame. Both the stuffing gland assemblies 3 and 5 are cooled and kept at an acceptable operating temperature for the packing or sealant included by the injection of a coolant/reaction gas through respectively nipples 10 and 11, preferably tangentially. Alternatively, any known means of distributing the particulate feed, for example reduced iron sponge, scrap and flux, so that it falls as a concentric curtain surrounding the burner's axis can be used, for instance the particulate feed can be fed as such a curtain from a Huberlein vertical kiln. In this manner the particulate feed is preheated, while protecting the converter walls (lining) from excessive radiant heat from the burner flame. If a reactant type coolant gas is used, containing hydrocarbons which react to form reducing gases, then the cooling gases coming from the said stuffing gland assemblies 3 and 5 can be used for this purpose as quench gases if the burner is mounted in the bell 12, as described in Example 2, if this type of operation is desired, or alternatively simply as a quench for the off-gases from the converter.

EXAMPLE 4

Figure 4:
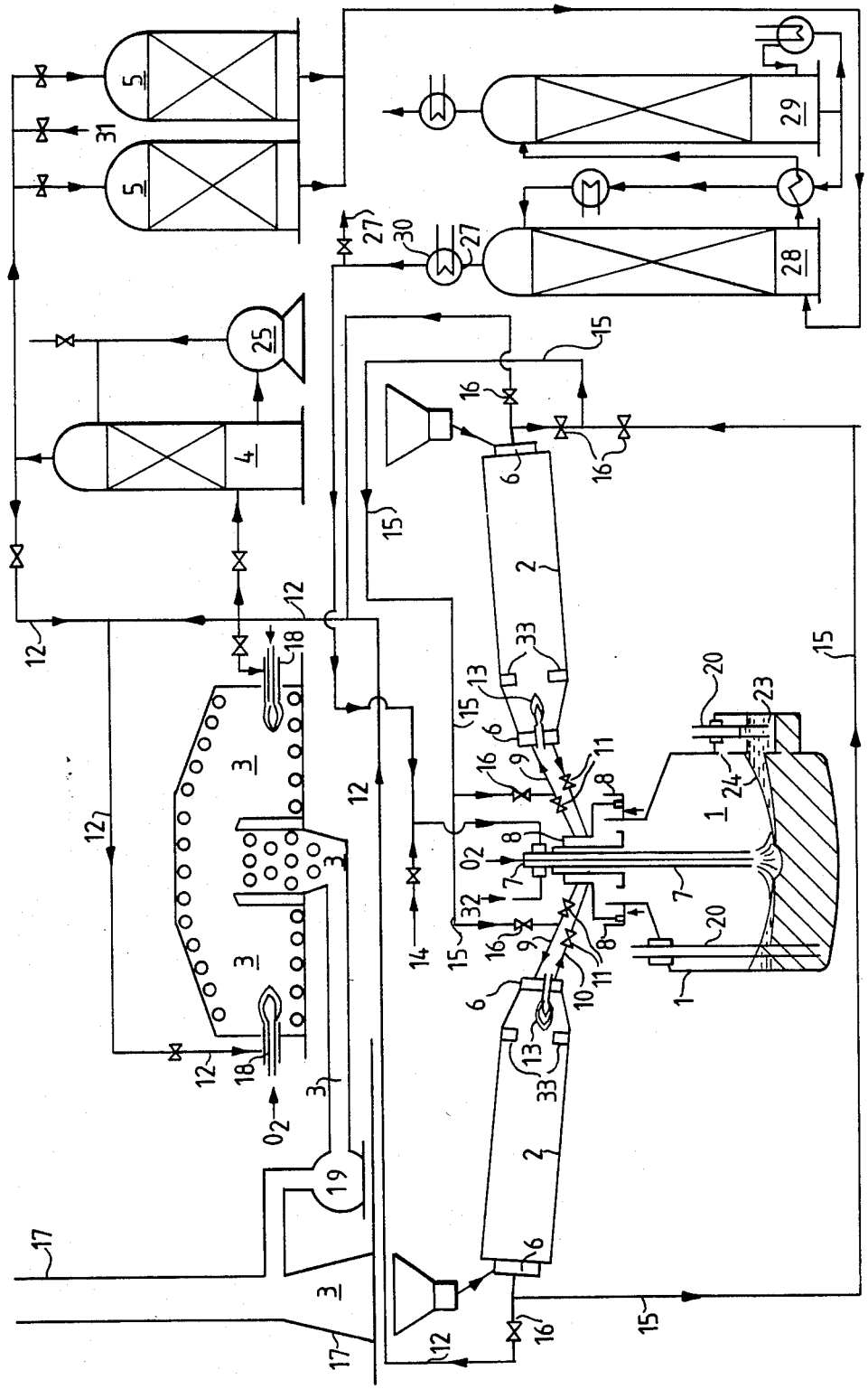
FIG. 4 illustrates a simplified flow scheme for improvement of the overall thermal efficiency of the steel making process in a converter utilizing the heat and reducing capacity of the off gases.
Figure 4A:
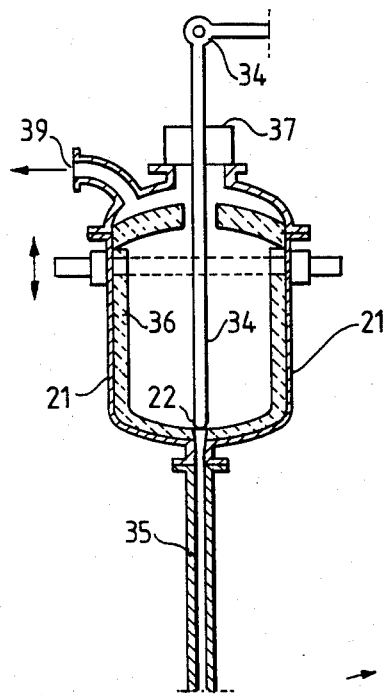
FIG. 4A illustrates means for tapping molten metal or slag without having to open the converter.
Figure 4B:
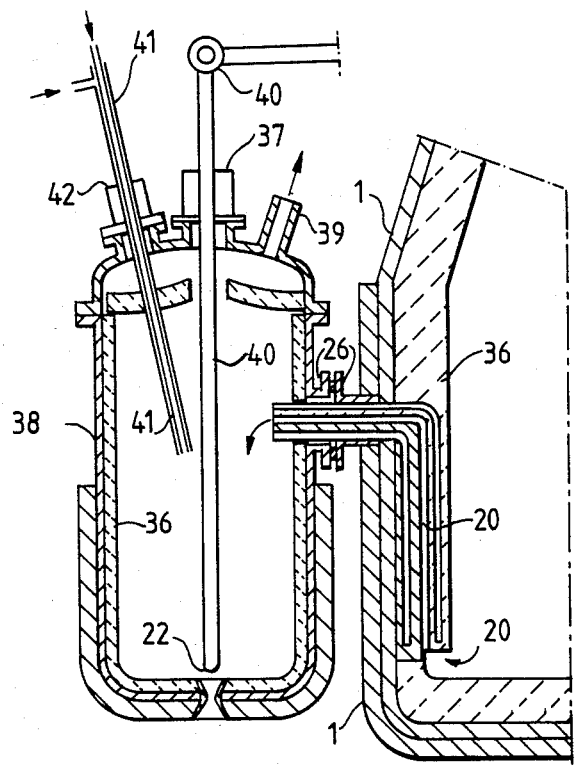
FIG. 4B illustrates an alternative tapping means.

In this example improvements of the overall thermal efficiency of the process of steel making in a converter by utilising the potential heat and reducing capacity of the off-gases are grouped together and shown as a simplified flow scheme (FIG. 4) illustrating these applications of this aspect of the invention. These improvements can be utilised either individually, or in combinations of two or more of them as dictated by local requirements. The combination shown as one example in FIG. 4 includes the full recovery of all the potential heat from the converter 1 off-gases by using them in recuperators 2 (and steam boiler 3, respectively) as a preheater/reducer for ore scrap and other feedstock, a washery 4 using hot asphalt in countercurrent to the off-gases to remove entrained dust, conventional shift reaction catalyst vessels 5 followed by a carbon dioxide absorber 28 to remove that component leaving a hydrogen stream or concentrate for use in the converter oxy-fuel ('partial combustion') burner 7 located in the said converter 1—or for other industrial uses. The said burner 7 is mounted through a gastight joint and bell assembly 8, as described in Example 2, and the said hydrogen stream or concentrate can be used as such as the fuel, or in combination with a solid fuel such as powdered coke as the carrier gas, alternatively in combination with a hydrocarbon fuel fed through line 14. The burner combustion gases are used as described in Example 2 for smelting and refining the converter charge, their low or negligible carbon monoxide partial pressure making them particularly suitable for making very low carbon content alloy steels in the high chromium percentage range. The converter off-gases are fed through line 9 to two (or more) recuperators which are fed with the solid feedstock charge for the steel converter (or electric furnace) for example, particulate scrap, iron ore, alloying constituents, or their oxides, and flux. The said two recuperators 2 are operated alternately either batchwise, continuously or semi-continuously as solid feed vessel for converter 1, acting as preheaters and reducers for the solid feedstock, the solid feed lines 10 to the converter 1 and the off-gas lines 9 from it being manifolded in the conventional manner using high temperature block valves 11 for the said alternate operation. Thus, while one recuperator is preheating and prereducing the solid charge the other is completing the ore reduction to the desired degree and feeding it to converter 1. The gas and solid feed pipes 9 and 10 and the off-gas pipes 12 are attached to the rotary recuperator (or kiln) by means of gastight rotary joint assemblies 6 for high temperature service, for example of the type described in my British Pat. No. 1,513,549. Both recuperators (rotary kilns) 2 are equipped with auxiliary oxy-fuel burners 13 designed for full or partial combustion operation, mounted in the inlet gas joint assemblies 6 to provide extra heat and reducing gases to supplement those derived from the converter 1. The recuperators can also be manifolded by pipes 15 and high temperature block valves 16 so that they can be operated alternatively in series gas flow with each vessel in turn being taken as first in series instead of straight alternate flow shown in FIG. 3. The hot/combustible off-gases from the recuperators are delivered by gas pipe 12 to a steam boiler 3 equipped with stack 17 and auxiliary burner (or burners) 18 in which the said off-gases and auxiliary fuel are burnt with a secondary air supply, adequate to give complete combustion, so that their full potential heat capacity is recovered. Conventional instruments and controls are supplied (not shown) to regulate the supply of fuel and oxygen to the converter oxy-fuel burner 7 and the auxiliary oxy-fuel burners 13 in the recuperators (regulating the oxygen potential H ratio—of the off-gases), and the fuel and auxiliary air to the steam boiler auxiliary burners 18 for efficient combustion in the boiler and to maintain its steam load. The said steam boiler is furnished with a stack blower 19 so that the pressure within the recuperators is held at the desired figure, normally at atmospheric pressure or slightly higher. The converter 1 can be provided with means for tapping molten metal or slag without having to open the converter. The said means for tapping comprising (FIG. 4A) refractory coated pipes 20, whose lower ends are immersed in the melt to a suitable depth, and a vacuum ladle of conventional type 21 with a lower leg 35 equipped with a stopper 22 which can be guided and lowered or raised within tapping pipes 20, entering at its upper end, so that the molten liquid slag or metal respectively can be transferred into the ladle 21 by applying a differential pressure between the converter and ladle sufficient to cause the liquid to flow into the latter. The said differential pressure is created by either applying a small positive pressure to the converter above atmospheric (if it is a gastight design) in which case the liquid flow can be assisted by gaslift furnished by an inert gas injected through a pipe, when a vacuum ladle is not needed, or if the latter is used then a vacuum is applied to the vacuum ladle sufficient to cause flow and in addition a small plus pressure can be used in the converter to assist in providing the said differential pressure (FIG. 4A). The stopper linkage 34 passes through a gastight seal 37 in the cover of the vacuum ladle, the said seal being preferably of the type described in my British Pat. No. 1,513,547 (q.v. for details). Flow through the tapping pipe 20 can also be achieved or assisted by tilting the converter. A further tapping alternative (FIG. 4B) is to provide a side tapping hole in the converter wall 1, to which the tapping pipe(s). 20 are connected, and then to attach the vacuum ladle to it by a gastight joint 26 through which the melt is sucked by the vacuum applied to the vacuum ladle 38 through the vacuum line 39. The said tapping hole is provided with a gastight nozzle and joint assembly 26, connecting the metallurgical vessel or converter 1 to the vacuum ladle 38 which is preferably of a type described in my British Pat. No. 1,513,547 (q.v. for details), and can advantageously be of the bellows type described in that said patent in order to accomoodate the relative movement of one vessel to another due, for example, to temperature changes. The said side tapping nozzle and assembly 26 is connected to the tapping pipe 20, both being protected by a refractory lining/coating, and the said tapping pipe can optionally be built into the refractory lining 36 of the said metallurgical vessel or converter 1, as shown in FIG. 4B. The stopper linkage 40 for the stopper 22 operates through a gastight seal, preferably of a type described in my British Pat. No. 1,513,547. The ladle(s) can be equipped with an auxiliary burner 41, entering through a gastight joint/seal 42, for preheating or maintaining the temperature of the ladle and for maintaining the desired H-ratio gas atmosphere in the ladle appropriate to the molten metal or alloy being handled. A slag chamber 23 equipped with weep holes 24 to allow molten metal to settle, can also be provided within the converter located so that the tapping pipe 20 can be accommodated within it, the said chamber being formed, for example, by a titanium partition suitably protected by the normal converter lining to resist attack. The said chamber is located with its upper lip at the appropriate height for the molten slag to flow into it which is blown radially outwards by the oxy-fuel (or oxygen lance) burner gases impinging on the melt surface.

For the prevention of atmospheric pollution, or catalyst contamination, caused by dust entrained in the off-gases from a metallurgical vessel, for example a steel converter and direct reduction plant, means are provided for washing the gases by passing them countercurrent to a stream or curtain of hot asphalt, or other heavy fraction such as tar which has a high flashpoint. The said means comprise a conventional column equipped with for example baffles, packing such as Raschig rings, or bubble trays over which the hot asphalt is recirculated by pump 25 to form a gas washery 4. The said washed gases can, for example, be processed in the conventional manner to yield a hydrogen stream 27, or a hydrogen concentrate, by treating them in a shift reaction unit 5 followed by a carbon dioxide absorption column 28 (details not shown) in which the carbon dioxide and hydrogen sulphide is removed by a recycled stream of a solvent such as di-isopropanolamine which is regenerated in a stripper column 29. The hydrogen stream produced can be cooled in cooler 30 to remove water vapour, and for example be used as an X-type fuel in burner 7 located in converter 1, for the manufacture of low carbon alloy or normal steel, preferably in a type of burner described in Example 1 in accordance with the methods for manufacturing such alloy steel described above. Alternatively the hydrogen stream can be used to fluidise a feed of powdered solid fuel 32 using the type of oxy-fuel burner described in FIG. 1C. Using the hot washed gases from the gas washery 4 no additional heat is required to operate the shift reaction unit 5, in which the catalyst requires a temperature of around 200°–400° C. for the reaction, preferably in the range of 280°–350° C., making the process highly heat efficient. If necessary the water content of the feed gases to the said shift reaction unit 5 can be supplemented by the addition of steam or water spray to them through line 31.

EXAMPLE 5

The beneficial effect of using baffles, in a rotary kiln or recuperator to increase gas/solid contact, and to give a more uniform bed level throughout the reaction zone, was demonstrated in a laboratory rotary kiln simulating the operation of a commercial kiln, for example one operating as disclosed in my British Pat. Nos. 1,513,547 and 1,213,641. The reducing feed gas contained unreacted butane and had a composition corresponding to an H:C ratio of 3:1 at a feed rate slightly in excess of that needed to meet the thermodynamic requirements for reducing wustite to metal, and the reaction was carried out at 910° C. using 1/16–1/32nd. in. screened prefluxed Consett sinter as the ore charge containing 55.2% total iron. The kiln 1 (FIG. 5) was equipped with eight baffles 2 with a segment 3 cut away on the circumference by chord 4 so that the radius of the baffle at the maximum point was reduced by about 50% at its maximum point (FIG. 5A). The baffles were mounted on a central rod 5 and rotated with the kiln at about 2 revolutions per minute. Alternatively, (FIG. 5B), instead of the said cut-away segment 3, holes can be drilled in that portion of the baffle, with larger holes 6 in the outer part and smaller holes 7 on the inner part. A small segment 8 can be included. Parallel tests carried out in a kiln without baffles showed that a very considerable increase in reaction rate occurred when baffles were used in a rotary kiln, as shown in FIG. 5C. For production of 90% reduced ore a residence time of only 41 minutes was required with baffles, compared with 137 minutes without baffles. For the heat balanced operation of the said cited Patent this is equivalent to a production of 8.7 tons/day/cubic meter of kiln volume, when scaled up, compared with 3.7 tons/day/cubic meter of kiln volume for the unbaffled kiln, or an increase in capacity to 2.35 times that of the unbaffled kiln.

EXAMPLE 6

The production of steels by a controlled SS blow, for example in accordance with my British Pat. Nos. 1,508,591 and 1,508,592 and earlier patents, permits the use of lower Vee ratios for the slag, in the range of 1.0 to 2.0 or lower, than is customary for the conventional oxygen ('BOS') blow where ratios of about 3.0 or higher are normally used, while manufacturing steel with low carbon, phosphorus and sulphur contents. This permits using lower grade ores (with a high gangue content) than is usual for steel production by conventional methods. Some typical results for SS operation obtained in a laboratory converter rig are given in Table II to illustrate this:

TABLE II

| | | | | | | | | | |
|---|---|---|---|---|---|---|---|---|---|
| Production of High Grade Steel (SS process) with low Vee Ratio | | | | | | | | | |
| SS Operation-Type | Vee Ratio of Slag | % Carbon | | Phosphorus | | Sulphur | | Metal Yield | % Cr Slag |
| | | Feed | Steel | Feed | Steel | Feed | Steel | | |
| 1. Steel ex Cast Iron plus iron sponge | 1.4 | 1.18 | 0.000 | 0.05 | 0.00 | — | 0.006 | — | — |
| 2. Steel ex C.I. + Sponge | 1.9 | 1.95 | 0.047 | 0.32 | 0.045 | — | — | 98.8% | — |
| 3. 18/8 Cr/Ni/Mo Alloy steel Mo stabilised | <1.0 | 0.83 | 0.12 | — | 0.015 | — | — | 99.5% | 4.1% |

EXAMPLE 7

Describes the production of very low carbon alloy steels using a laboratory converter, simulating an electric furnace, with improvements on the methods described in my British Pat. Nos. 1,508,591 and 1,508,592. These improvements consisted in varying the oxygen potential of the melt system for successive and alternate periods of the said melt by using a blowgas with a low oxygen potential, in this example preferably hydrogen, in one set of periods, and by adding partly reduced iron sponge containing unreduced wustite in successive additions as small batches in the second set of alternate period. Alternatively, a blowgas with a high H-ratio can be used to obtain the said high oxygen potential in the said second set of periods, instead of, or in addition to, using partly reduced iron sponge for the purpose. In this manner the said melt system is subjected to periods of alternating low and high oxygen potential. In the latter periods carbon in the melt (and other impurities) was oxidised mainly to carbon monoxide and removed from the system in the off-gases from the blowgas, while simultaneously a minor part of the easily oxidisable alloy components in the melt, for example chromium, were oxidised and the oxides taken up in the slag. In the former periods, of low oxygen potential, and with the hydrogen blowgas having a nil partial pressure of carbon monoxide, the metallic oxides in the slag are reduced back to metal, and the carbon in the melt is stripped out of the melt by the blowgas as carbon monoxide, together with undesirable nitrogen, and removed from the system until the oxygen potential of the system falls to a low figure, when the cycle is repeated. In this manner the melt is repeatedly subjected to conditions of thermodynamical equilibria under which the blowgases can reduce the carbon content of the melt to a figure approaching zero, while at the same time the build up of, for example, chromium in the slag resulting in low chromium recovery is prevented. This run was conducted in three stages, as follows:

Stage 1—Melt Period

The initial charge, melted under hydrogen, had the following composition: iron from steel, ferrochrome and iron sponge 121.5 grams, chromium from high carbon ferrochrome (3%C) 33.8 grams, nickel 16 grams. Lime used as flux was 8.4 grams, and 1 gram of titanium dioxide was added. The sponge iron, 30 grams, in the initial charge was partly reduced prefluxed Consett Sinter (total Fe content 65.6% wt., oxygen content 4.6%wt.), and was sufficient to reduce the carbon content of the melt to 0.1% within one minute of clear melt at 1650° C. The said initial amount of iron sponge was sufficiently low to cause no melting problems.

Stage 2—1st. Blow

The melt was blown with hydrogen (0.402 gram moles/hour) for a period of 66 minutes, and over a period of 19 minutes (from melt time 8 minutes to 27 minutes) a further 50 grams of the said iron sponge was added in parcels of about 2 to 3 grams at intervals of one minute, making about 20 alternating intervals each of high and low oxygen potential in the system.

Stage 3—2nd. Blow

The melt was blown (1670°–1770° C.) with a low oxygen potential (H ratio 0.1) blow gas, having an equilibrium composition at melt temperature: hydrogen 67.8%, water vapour 6.9%, carbon monoxide 24.3% and carbon dioxide 1.0% volume, at the rate of 0.538 gram moles/hour, for a period of 125 minutes (from melt time 66–191 minutes). In this stage the reduction of slag was completed, and phosphorus removal. The melt was cooled in a stream of argon. The final billet weighed 207.1 grams, and had the composition: chromium 16.13% (melt Cr recovery 98.8%), nickel 7.7% and phosphorus 0.025% (calculated Vee ratio of slag 1.8). The carbon analyses during the course of the melt were as follows:

| Time from | Carbon Content, wt. % of Melt | | | |
|---|---|---|---|---|
| Clear Melt: | 1 min. | 34 mins. | 98 mins. | 191 mins. |
| Sample: | Melt | Melt | Melt | Billet |
| Temperature °C. | 1650 | 1646 | 1671 | 1769 |
| Carbon - wt. % | 0.102 | 0.041 | 0.025 | <0.01 |

The carbon content was reduced to 0.1% immediately after melt, to 0.041% after 34 minutes and 0.025% after 98 minutes, in spite of the mild conditions used in stage 2.

EXAMPLE 8

An 'afterblow' of carbon monoxide is effective in degasifying a steel melt such as that from an SS blow producing low carbon and other steel grades. This was demonstrated in a laboratory SS converter, the melt (256 grams) being finished, after the SS gases were cut out, by a short blow with carbon monoxide purge gas at the rate of 2.3 cubic centimeters per second continued for a total of 96.1 seconds. The purge gas plus dissolved gases stripped from the melt were collected over three successive periods of 31.9, 32.6 and 31.6 seconds respectively, and analysed. The composition of these gases stripped out from the melt were then calculated, deducting the purge gas amounts:

TABLE III

| Composition of Gases Stripped out of Steel Melt: (mls per 256 grams of steel melt) | | | | | | |
|---|---|---|---|---|---|---|
| Period | Afterblow Time secs. | CO | $H_2$ | $H_2O$ | $CO_2$ | Total Gases |
| No. 1 | 31.9 | 17.01 | 36.99 | 11.82 | 7.23 | 73.05 |
| No. 2 | 32.6 | 39.21 | 6.18 | 0.75 | 3.45 | 49.59 |
| Total | 64.5 | 56.22 | 43.17 | 12.57 | 10.68 | 122.64 mls. |

The off-gases for the third period of the afterblow consisted of carbon monoxide, so that the degasification was completed in the first two periods, using a total of 148.6 mls. of carbon monoxide for the 256 grams of steel melt, equivalent to 20.5 cubic feet of carbon monoxide purge gas per ton of steel degasified. The total of carbon monoxide and dioxide removed was equivalent to 0.014 gms. of carbon per 100 grams of steel or 0.014%C, while the analysis of the melt just before the blow with carbon monoxide showed 0.015%C and 0.000%C after, or a removal of 0.015%C in the afterblow. The steel melt was cooled in a stream of argon.

I claim:

1. A method for carrying out a metallurgical process which includes generating heat and a controlled atmosphere by means of an oxy-fuel or air-fuel burner, wherein fuel consumption is reduced and efficiency improved said method comprising using a fuel which has a heat of decomposition selected from exothermic and zero and consisting substantially of hydrocarbons and mixtures of hydrocarbons having 1 or more double bonds, including those having a ring structure or fused ring structure, hydrogen and carbon.

2. The method as claimed in claim 1, wherein the metallurgical process is carried out in a steel converter or an electric furnace.

3. The method as claimed in claim 1, wherein the fuel comprises a substantial proportion of at least one hydrocarbon having at least one double bond per molecule.

4. The method as claimed in claim 1 in which the metallurgical process is the manufacture of one of steel, an alloy steel and a ferrous alloy, by a method which comprises charging to a converter a metal feedstock, at least one member selected from the class consisting of alloying constituents and the oxides of such alloying constituents, and flux, and heating and blowing the melt with oxidising gases from a burner in order to oxidise and remove the impurities.

5. In a method for the manufacture of a member selected from the class consisting of very low carbon steels, alloy steels and ferrous alloys, having low phosphorous, sulphur and nitrogen contents, in a steel converter or electric furnace which includes generating heat and a controlled atmosphere by means of an oxy-fuel or air-fuel burner, in which fuel consumption is reduced and efficiency is improved, the improvement which comprises use of a fuel which has a heat of decomposition ranging from exothermic to an endothermic heat of decomposition of not more than 1.0 K cals per carbon atom of said fuel expressed as a hypothetical hydrocarbon $C_1H_x$, said fuel being selected from the group consisting substantially of hydrocarbons and mixtures of hydrocarbons having 1 or more double bonds, including those having a ring structure or fused ring structure, hydrogen and carbon and in which a steel melt is subjected to a number of alternate short periods of, respectively, high and low oxygen potential, in the first of said periods the carbon and other impurities being oxidised and removed from the system, mainly as carbon monoxide, while simultaneously part of the metal in the melt forms its oxide and is absorbed in the slag; and in the second of said periods the carbon continues to be purged from the melt by the blowgas as carbon monoxide, while the metallic oxide is reduced to metal again, the said low oxygen potential periods being achieved by lowering the H ratio of the blowgas without metal oxide addition.

6. The method of claim 5 wherein the high oxygen potential is achieved by employing a blowgas with a high H ratio during that period.

7. The method of claim 5 wherein the high oxygen potential is achieved by charging a metal oxide during that period.

8. A method as claimed in claim 5 in which the fuel is a member selected from the class consisting of at least one hydrocarbon having at least one double bond per molecule and a pulverised solid fuel, fluidised in a stream of another fuel.

9. A method as claimed in claim 5 wherein the melt is first blown to a moderate carbon content before applying the alternate short periods.

10. A method as claimed in claim 1 in which the fuel is hydrogen and means are provided for washing dust laden hot off-gases from the steel converter with a high boiling point petroleum fraction in order to remove entrained dust, while still maintaining the temperature of the hot gases, and the hot washed off-gases are utilised for the manufacture of a hydrogen-rich gas by cooling them to the desired process temperature by the injection of a water-spray, subjecting the mixture of steam and hot gas thus provided to the shift reaction by contacting it in at least one catalyst chamber with a catalyst to convert the carbon monoxide content of the said mixture to carbon dioxide by reaction with the water with formation of hydrogen, and the stripping out the carbon dioxide formed together with any hydrogen sulphide present in the gases using a suitable solvent, the hydrogen-rich gas being recycled for use as the fuel.

11. The method as claimed in claim 1 in which hot off-gases from the metallurgical process vessel are led to at least one recuperator of the baffled type in which the potential heat and reducing capacity of the said hot off-gases is utilised to heat and reduce a solid feedstock for charging to the said metallurgical process vessel.

12. The method as claimed in claim 1 wherein a final melt of a member selected from the class consisting of steel, alloy steel, and ferrous alloy melt in a converter is degassed by giving it a short afterblow with carbon monoxide, the said afterblow reducing the hydrogen content as the composition of the gases stripped out of the melt approaches that dictated by the applicable shift reaction equilibrium, while the oxygen content is also reduced leading to a reduction in the carbon content of the metallic melt, the elemental carbon and oxygen being purged out as carbon monoxide.

13. The method as claimed in claim 1, wherein a particulate solid feedstock is fed to the metallurgical vessel, and the solid feedstock is distributed evenly as a concentric envelope around the periphery of the burner flame, so that particles are entrained by the kinetic energy of the high velocity gases surrounding the burner flame.

14. The method as claimed in claim 1, wherein flux is added in a sufficient quantity to give a fluid slag with a "Vee Ratio" within the range of 0.5 to 2.8 and magnesium oxide is added in the flux in an appreciable amount to minimize refractory attack.

15. The process as claimed in claim 1, carried out in a metallurgical vessel having improved insulation and heat efficiency, the vessel having two or more vessel shells, the inner wall or the inner shell being lined with insulation lining suitable for the metallurgical process involved, the space between the inner and outer shells being filled with a high efficiency insulation, and means being provided to support the weight of the inner shell to prevent crushing and over compaction of said high efficiency insulation.

16. The method as claimed in claim 1, carried out in a steel converter, wherein means are provided for tapping the steel converter comprising a conduit inserted in the converter, through which molten metal can flow, coupled with the application of a differential pressure across the two ends of the said conduit, the said differential pressure being achieved by applying a small positive pressure above atmospheric within the converter.

17. The method as claimed in claim 1, carried out in a steel converter, wherein means are provided for tapping the steel converter by using a vacuum ladle to receive the steel drawn off.

18. The method as claimed in claim 1 wherein, for the production of a member selected from the class consisting of a low phosphorous and sulphur steel, alloy steel and ferrous alloys, means are provided for adding flux to, and removing slag from, the converter either continuously or substantially continuously by making successive small removals respectively with intervals between them.

19. The method as claimed in claim 1 for operating a steel converter, wherein the melt in the steel converter is first blown to a low carbon content in order to obtain a low phosphorous and sulphur content, and then recarburized by a finishing blow with the required amount of hydrocarbon which is cracked into its elemental constituents with the carbon being substantially absorbed by the metallic melt.

* * * * *